(12) United States Patent
Ye et al.

(10) Patent No.: US 11,531,190 B2
(45) Date of Patent: Dec. 20, 2022

(54) OPTICAL IMAGING LENS ASSEMBLY

(71) Applicant: Zhejiang Sunny Optical Co., Ltd, Zhejiang Province (CN)

(72) Inventors: Lihui Ye, Zhejiang Province (CN); Fujian Dai, Zhejiang Province (CN); Liefeng Zhao, Zhejiang Province (CN)

(73) Assignee: ZHEJIANG SUNNY OPTICAL CO., LTD., Zhejiang Province (CN)

( * ) Notice: Subject to any disclaimer, the term of this patent is extended or adjusted under 35 U.S.C. 154(b) by 322 days.

(21) Appl. No.: 16/880,059

(22) Filed: May 21, 2020

(65) Prior Publication Data

US 2021/0003824 A1 Jan. 7, 2021

(30) Foreign Application Priority Data

Jul. 2, 2019 (CN) .......................... 201910590388.8

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | |
|---|---|---|
| 10,215,961 B2 | 2/2019 | Gong et al. |
| 2016/0025953 A1 | 1/2016 | Jung |
| 2016/0313537 A1 | 10/2016 | Mercado |
| 2017/0235103 A1 | 8/2017 | Lai et al. |
| 2020/0363610 A1* | 11/2020 | Ko .......................... G02B 9/64 |

FOREIGN PATENT DOCUMENTS

| | | |
|---|---|---|
| CN | 106896474 A | 6/2017 |
| CN | 107436481 A | 12/2017 |
| CN | 109407278 A | 3/2019 |
| JP | 2009192996 A | 8/2009 |
| JP | 2012234169 A | 11/2012 |

OTHER PUBLICATIONS

Translation of Office Action dated Sep. 11, 2021, in connection with Indian Patent Application No. 202044022284.
First Office Action dated Jul. 1, 2022, in connection with Chinese Patent Application No. 202110867648.9.

* cited by examiner

*Primary Examiner* — Joseph P Martinez
(74) *Attorney, Agent, or Firm* — Norris McLaughlin, P.A.

(57) ABSTRACT

The present disclosure provides an optical imaging lens assembly including, sequentially from an object side to an image side along an optical axis, a first lens having a positive refractive power; a second lens having a positive refractive power; a third lens having a negative refractive power; a fourth lens having a refractive power, an object-side surface thereof being a concave surface, and an image-side surface thereof being a convex surface; a fifth lens having a refractive power; a sixth lens having a positive refractive power, an object-side surface thereof being a concave surface, and an image-side surface thereof being a convex surface; and a seventh lens having a refractive power. An effective focal length f of the optical imaging lens assembly and an entrance pupil diameter of the optical imaging lens assembly satisfy f/EPD<1.5.

18 Claims, 12 Drawing Sheets

OPTICAL IMAGING LENS ASSEMBLY

CROSS-REFERENCE TO RELATED APPLICATION

This application claims benefit of priority to Chinese Patent Application No. 201910590388.8 filed on Jul. 2, 2019 before the China National Intellectual Property Administration, the entire disclosure of which is incorporated herein by reference in its entity.

TECHNICAL FIELD

The present disclosure relates to an optical imaging lens assembly, and specifically, relates to an optical imaging lens assembly including seven lenses.

BACKGROUND

At present, the requirements on imaging functions of portable electronic devices are getting higher and higher. Although the image processing algorithms are usually used to process images, the optical characteristics of the optical imaging lens assembly directly affect the imaging quality of the initial image. Therefore, the performance of the optical imaging lens assembly used in portable electronic devices is also increasingly demanded.

Since the size of the portable electronic device is desired to be as small as possible, the optical imaging lens assembly provided thereon is expected to have both the characteristics of miniaturization and high imaging quality.

SUMMARY

The present disclosure provides an optical imaging lens assembly that can at least solve or partially address at least one of the above disadvantages of the prior art, for example, a thin, large-aperture optical imaging lens assembly including seven lenses.

In one aspect, the present disclosure provides an optical imaging lens assembly which may include, sequentially from an object side to an image side along an optical axis, a first lens having a positive refractive power; a second lens having a positive refractive power; a third lens having a negative refractive power; a fourth lens having a refractive power, an object-side surface of the fourth lens being a concave surface, and an image-side surface of the fourth lens being a convex surface; a fifth lens having a refractive power; a sixth lens having a positive refractive power, an object-side surface of the sixth lens being a concave surface, and an image-side surface of the sixth lens being a convex surface; and a seventh lens having a refractive power. An effective focal length f and an entrance pupil diameter EPD of the optical imaging lens assembly satisfy f/EPD<1.5.

According to an embodiment of the present disclosure, the optical imaging lens assembly further includes a stop. The stop is disposed between the object side and the first lens.

According to an embodiment of the present disclosure, the effective focal length f of the optical imaging lens assembly and an effective focal length f1 of the first lens may satisfy 1.0<f1/f<2.0.

According to an embodiment of the present disclosure, a combined focal length f23 of the second lens and the third lens and an effective focal length f4 of the fourth lens may satisfy −2.0≤f23/f4<−1.0.

According to an embodiment of the present disclosure, an effective focal length f6 of the sixth lens and an effective focal length f7 of the seventh lens may satisfy −1.5<f6/f7<−1.0.

According to an embodiment of the present disclosure, a radius of curvature R1 of an object-side surface of the first lens and a radius of curvature R2 of an image-side surface of the first lens may satisfy 2.5<R2/R1<4.0.

According to an embodiment of the present disclosure, a radius of curvature R5 of an object-side surface of the third lens and a radius of curvature R6 of an image-side surface of the third lens may satisfy 1.0<R5/R6<1.5.

According to an embodiment of the present disclosure, a radius of curvature R7 of the object-side surface of the fourth lens and a radius of curvature R8 of the image-side surface of the fourth lens may satisfy 2.0<R7/R8<5.0.

According to an embodiment of the present disclosure, a radius of curvature R9 of an object-side surface of the fifth lens and a radius of curvature R10 of an image-side surface of the fifth lens may satisfy 0.5<R9/R10<1.5.

According to an embodiment of the present disclosure, a radius of curvature R11 of the object-side surface of the sixth lens and a radius of curvature R13 of an object-side surface of the seventh lens may satisfy 1.5≤R11/R13<3.0.

According to an embodiment of the present disclosure, a radius of curvature R13 of an object-side surface of the seventh lens and a radius of curvature R14 of an image-side surface of the seventh lens may satisfy −3.05≤R13/R14≤−1.77.

According to an embodiment of the present disclosure, a center thickness CT2 of the second lens along the optical axis, a spaced interval T12 between the first lens and the second lens along the optical axis and a spaced interval T23 between the second lens and the third lens along the optical axis may satisfy 1.5≤CT2/(T12+T23)<3.0.

According to an embodiment of the present disclosure, a spaced interval T34 between the third lens and the fourth lens along the optical axis and a center thickness CT3 of the third lens along the optical axis may satisfy 2.5<T34/CT3≤3.0.

According to an embodiment of the present disclosure, a center thickness CT4 of the fourth lens along the optical axis, a spaced interval T45 between the fourth lens and the fifth lens along the optical axis, and a spaced interval T56 between the fifth lens and the sixth lens along the optical axis may satisfy 1.0<CT4/(T45+T56)<2.0.

According to an embodiment of the present disclosure, a center thickness CT6 of the sixth lens along the optical axis and a center thickness CT7 of the seventh lens along the optical axis may satisfy 1.5≤CT6/CT7<2.0.

According to an embodiment of the present disclosure, a center thickness CT6 of the sixth lens along the optical axis and an edge thickness ET6 of the sixth lens may satisfy 1.5<CT6/ET6<3.0.

According to an embodiment of the present disclosure, an on-axis distance SAG62 between an intersection of the image-side surface of the sixth lens and the optical axis and an apex of an effective radius of the image-side surface of the sixth lens and an on-axis distance SAG71 between an intersection of an object-side surface of the seventh lens and the optical axis and an apex of an effective radius of the object-side surface of the seventh lens may satisfy 1.5<SAG71/SAG62<2.5.

According to an embodiment of the present disclosure, an on-axis distance TTL from an object-side surface of the first lens to an imaging plane of the optical imaging lens assembly and half of a diagonal length ImgH of an effective pixel area on the imaging plane may satisfy 1.5<TTL/ImgH<2.0.

According to an embodiment of the present disclosure, a refractive index n2 of the second lens may satisfy 1.65≤n2, a refractive index n3 of the third lens may satisfy 1.65≤n3, and a refractive index n5 of the fifth lens may satisfy 1.65≤n5.

The present disclosure provides an optical imaging lens assembly including a plurality of lenses (for example, seven lenses), and the optical imaging lens assembly has advantageous effects such as miniaturization and high image quality by rationally assigning the refractive power of each lens, the surface shape, the center thickness of each lens, and the on-axis spaced interval between the lenses and the like. In addition, the ratio of the effective focal length of the optical lens assembly to the entrance pupil diameter of the optical lens assembly is controlled so that the optical lens assembly has a larger aperture to increase the amount of light entering per unit time, thereby improving the overall brightness of the image. Also, by matching the positive and negative distribution of the refractive power of the lenses, the low-order aberration of the optical imaging lens assembly may be effectively compensated and controlled, thereby improving the imaging quality.

BRIEF DESCRIPTION OF THE DRAWINGS

The above and other advantages of the embodiments of the present disclosure will become apparent through the detailed description with reference to the following accompanying drawings, and the accompanying drawings are intended to illustrate exemplary embodiments of the present disclosure and not to limit them. In the accompanying drawings:

FIG. 1 illustrates a schematic structural view of an optical imaging lens assembly according to Example 1 of the present disclosure;

DETAILED DESCRIPTION OF EMBODIMENTS

Figure 2A:
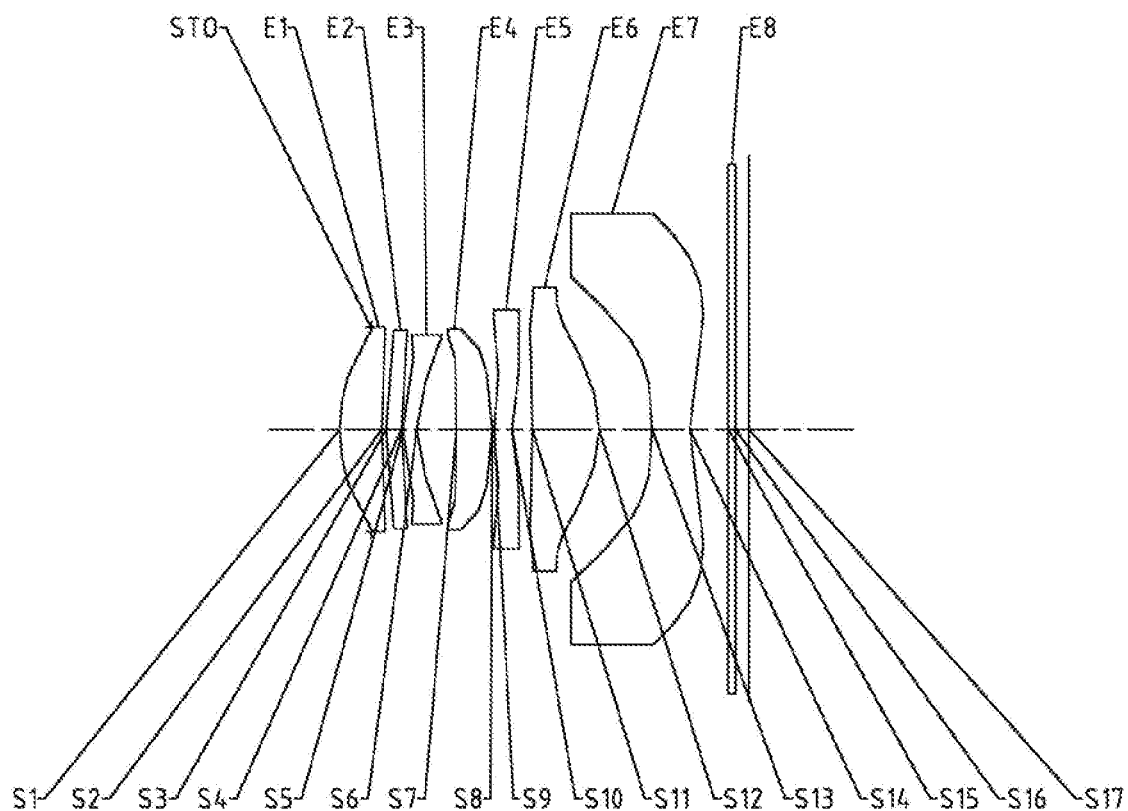
FIGS. 2A to 2C illustrate a longitudinal aberration curve, an astigmatic curve, and a distortion curve according to Example 1 of the present disclosure, sequentially.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens of the optical imaging lens assembly discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include, a first lens, a second lens, a third lens, a fourth lens, a fifth lens, a sixth lens and a seventh lens. The seven lenses are arranged sequentially from an object side to an image side along an optical axis, and there may be an air interval between each two adjacent lenses.

In an exemplary embodiment, the first lens may have a positive refractive power; the second lens has a positive refractive power; the third lens has a negative refractive power; the fourth lens has a refractive power, an object-side surface thereof is a concave surface, and an image-side surface thereof is a convex surface; the fifth lens has a refractive power; the sixth lens has a positive refractive power, an object-side surface thereof is a concave surface, and an image-side surface thereof is a convex surface; and the seventh lens has a refractive power. By rationally configuring the refractive power of the lenses, the low-order aberrations of the system may be effectively compensated, thereby improving the imaging quality.

In an exemplary embodiment, the optical imaging lens assembly provided by the present disclosure may satisfy: f/EPD<1.5, where f is an effective focal length of the optical imaging lens assembly and EPD is an entrance pupil diameter of the optical imaging lens assembly. As an example, 1.4<f/EPD<1.5. By controlling the effective focal length and entrance pupil diameter of the optical imaging lens assembly, the optical imaging lens assembly may have a larger aperture, thereby improving the overall brightness of the image.

In an exemplary embodiment, the optical imaging lens assembly may further include a stop, and the stop may be disposed between the object side and the first lens. The amount of light entering the optical imaging lens assembly may be better controlled, and the space occupied by the stop is small.

In an exemplary embodiment, the optical imaging lens assembly may satisfy: $1.0 \leq f1/f < 2.0$, where f is an effective focal length of the optical imaging lens assembly and f1 is an effective focal length of the first lens. As an example, $1.2 \leq f1/f \leq 1.8$, for example, $1.3 < f1/f < 1.6$. By controlling the effective focal length of the first lens, the effective focal length of the optical imaging lens assembly may be increased, and at the same time the field curvature of the optical imaging lens assembly may be compensated.

In an exemplary embodiment, the optical imaging lens assembly may satisfy: $-2.0 \leq f23/f4 < -1.0$, where f23 is a combined focal length of the second lens and the third lens and f4 is an effective focal length of the fourth lens. As an example, $-1.96 \leq f23/f4 \leq -1.04$. By controlling the ratio of the combined focal length of the second lens and the third lens to the effective focal length of the fourth lens, the distortion at the paraxial area may be effectively corrected, thereby improving the imaging quality of the optical imaging lens assembly.

In an exemplary embodiment, the optical imaging lens assembly may satisfy: $-1.5 < f6/f7 < -1.0$, where f6 is an effective focal length of the sixth lens and f7 is an effective focal length of the seventh lens. As an example, $-1.4 < f6/f7 < -1.2$. By controlling the ratio of the effective focal length of the sixth lens to the effective focal length of the seventh lens, the amount of astigmatic of the optical imaging lens assembly may be controlled.

In an exemplary embodiment, the optical imaging lens assembly may satisfy: $2.5 < R2/R1 < 4.0$, where R1 is a radius of curvature of an object-side surface of the first lens and R2 is a radius of curvature of an image-side surface of the first lens. As an example, $2.6 < R2/R1 \leq 3.97$. By controlling the radius of curvature of the object-side surface of the first lens and the radius of curvature of the image-side surface of the first lens, the spherical aberration and astigmatic of the optical imaging lens assembly may be reduced. Optionally, the object-side surface of the first lens is a convex surface, and the image-side surface of the first lens is a concave surface.

In an exemplary embodiment, the optical imaging lens assembly may satisfy: $1.0 < R5/R6 < 1.5$, where R5 is a radius of curvature of an object-side surface of the third lens and R6 is a radius of curvature of an image-side surface of the third lens. As an example, $1.18 \leq R5/R6 \leq 1.47$. As an example, the third lens is a meniscus lens which is convex toward the object side. By controlling the radius of curvature of the object-side surface of the third lens and the radius of curvature of the image-side surface of the third lens to control the bending direction of the third lens, the field curvature of the optical imaging lens assembly may be effectively controlled, thereby improving the imaging quality.

In an exemplary embodiment, the optical imaging lens assembly may satisfy: $2.0 < R7/R8 < 5.0$, where R7 is a radius of curvature of the object-side surface of the fourth lens and R8 is a radius of curvature of the image-side surface of the fourth lens. As an example, $2.7 \leq R7/R8 < 4.4$. By controlling the radius of curvature of the object-side surface of the fourth lens and the radius of curvature of the image-side surface of the fourth lens, the spherical aberration and astigmatic of the optical imaging lens assembly may be compensated.

In an exemplary embodiment, the optical imaging lens assembly may satisfy: $0.5 < R9/R10 < 1.5$, where R9 is a radius of curvature of an object-side surface of the fifth lens and R10 is a radius of curvature of an image-side surface of the fifth lens. As an example, $0.7 < R9/R10 < 1.4$, for example, $0.9 < R9/R10 \leq 1.2$. By controlling the radius of curvature of the object-side surface of the fifth lens and the radius of curvature of the image-side surface of the fifth lens, the field curvature of the optical imaging lens assembly may be improved, thereby improving the imaging quality of the optical imaging lens assembly. Optionally, the object-side surface of the fifth lens is a convex surface, and the image-side surface of the fifth lens is a concave surface.

In an exemplary embodiment, the optical imaging lens assembly may satisfy: $1.5 \leq R11/R13 < 3.0$, where R11 is a radius of curvature of the object-side surface of the sixth lens and R13 is a radius of curvature of an object-side surface of the seventh lens. As an example, $1.53 \leq R11/R13 < 2.95$. By controlling the radius of curvature of the object-side surface of the sixth lens and the radius of curvature of the object-side surface of the seventh lens, the chromatic aberration of the optical imaging lens assembly may be corrected, and various aberrations such as chromatic aberration, spherical aberration, field curvature, and distortion are compensated effectively.

In an exemplary embodiment, the optical imaging lens assembly may satisfy: $-3.05 \leq R13/R14 \leq -1.77$, where R13 is a radius of curvature of an object-side surface of the seventh lens and R14 is a radius of curvature of an image-side surface of the seventh lens. Reasonably controlling the radius of curvature of the object-side surface of the seventh lens and the radius of curvature of the image-side surface of the seventh lens may improve the field curvature of the optical imaging lens assembly, thereby improving the imaging quality of the optical imaging lens assembly.

In an exemplary embodiment, the optical imaging lens assembly may satisfy: $1.5 \leq CT2/(T12+T23) < 3.0$, where CT2 is a center thickness of the second lens along the optical axis, T12 is a spaced interval between the first lens and the second lens along the optical axis and T23 is a spaced interval between the second lens and the third lens along the optical axis. As an example, $1.70 \leq CT2/(T12+T23) < 2.75$. Reasonably controlling the ratio of the center thickness of the second lens along the optical axis to the sum of the air intervals on both sides of the second lens may make the size distribution of each lens uniform and improve the assembly stability of the optical imaging lens assembly, at the same time shorten the total length of the optical imaging lens assembly and reduce the aberration of the optical imaging lens assembly.

In an exemplary embodiment, the optical imaging lens assembly may satisfy: $2.5 < T34/CT3 \leq 3.0$, where T34 is a spaced interval between the third lens and the fourth lens along the optical axis and CT3 is a center thickness of the third lens along the optical axis. As an example, $2.70 < T34/CT3 \leq 2.98$, for example, $2.80 < T34/CT3 \leq 2.88$. Reasonably controlling the ratio of the spaced interval between the third lens and the fourth lens along the optical axis to the center thickness of the third lens along the optical axis may make the third lens with smaller size achieve a better imaging quality, make the lenses of the optical imaging lens assembly more compact, thus improving space utilization and reducing the length of the optical imaging lens assembly.

In an exemplary embodiment, the optical imaging lens assembly may satisfy: $1.0 < CT4/(T45+T56) < 2.0$, where CT4 is a center thickness of the fourth lens along the optical axis, T45 is a spaced interval between the fourth lens and the fifth lens along the optical axis, and T56 is a spaced interval between the fifth lens and the sixth lens along the optical axis. As an example, $1.1 < CT4/(T45+T56) < 1.8$. Reasonably controlling the ratio of the center thickness of the fourth lens along the optical axis to the sum of the air intervals on both sides of the fifth lens may make the size distribution of each lens uniform and make the lenses easy to process, and also reduce the difficulty of assembly of the optical imaging lens assembly.

In an exemplary embodiment, the optical imaging lens assembly may satisfy: $1.5 \leq CT6/CT7 < 2.0$, where CT6 is a center thickness of the sixth lens along the optical axis and CT7 is a center thickness of the seventh lens along the optical axis. As an example, $1.52 \leq CT6/CT7 < 1.80$. Reasonably controlling the ratio of the center thickness of the sixth lens along the optical axis to the center thickness of the seventh lens along the optical axis may make the size distribution of the sixth lens and the seventh lens uniform, improve the assembly stability of the optical imaging lens, and reduce the aberration of the optical imaging lens assembly.

In an exemplary embodiment, the optical imaging lens assembly may satisfy: $1.5 < CT6/ET6 < 3.0$, where CT6 is a center thickness of the sixth lens along the optical axis and ET6 is an edge thickness of the sixth lens. As an example, $1.8 < CT6/ET6 \leq 2.93$. Reasonably controlling the center thickness and edge thickness of the sixth lens is beneficial to control the direction of light passing through the sixth lens. By controlling part of the light rays passing through the sixth lens to be irradiated on the imaging surface, the optical imaging lens assembly has a better ability to eliminate distortion.

In an exemplary embodiment, the optical imaging lens assembly may satisfy: $1.5 < SAG71/SAG62 < 2.5$, where SAG62 is an on-axis distance between an intersection of the image-side surface of the sixth lens and the optical axis and an apex of an effective radius of the image-side surface of the sixth lens, and SAG71 is an on-axis distance between an intersection of an object-side surface of the seventh lens and the optical axis and an apex of an effective radius of the object-side surface of the seventh lens. As an example, $1.6 < SAG71/SAG62 < 2.2$. By controlling the matching of the shape of the image-side surface of the sixth lens and the shape of the object-side surface of the seventh lens, the sixth lens and the seventh lens have a greater refractive ability for light at the off-axis field of view, thereby improving the resolution of the optical imaging lens assembly and facilitating shorten the length of the optical imaging lens.

In an exemplary embodiment, the optical imaging lens assembly may satisfy: $1.5 < TTL/ImgH < 2.0$, where TTL is an on-axis distance from an object-side surface of the first lens to an imaging plane of the optical imaging lens assembly, and ImgH is half of a diagonal length of an effective pixel area on the imaging plane. As an example, $1.55 < TTL/ImgH < 1.80$. Reasonably controlling the ratio of the on-axis distance between the object-side surface of the first lens and the imaging surface of the optical imaging lens assembly to the image height is beneficial to reduce the size of the optical imaging lens assembly.

In an exemplary embodiment, the optical imaging lens assembly may satisfy: $1.65 \leq n2$, $1.65 \leq n3$, and $1.65 \leq n5$, where n2 is a refractive index of the second lens, n3 is a refractive index of the third lens and n5 is a refractive index of the fifth lens. The material of the second lens, the material of the third lens, and the material of the fifth lens have a high refractive index, which may reduce the phase difference of the optical imaging lens assembly, thereby improving the imaging quality of the optical imaging lens assembly.

Optionally, the above optical imaging lens assembly may further include an optical filter for correcting the color deviation and/or a protective glass for protecting the photosensitive element on the imaging plane.

The optical imaging lens assembly according to the above embodiments of the present disclosure may employ a plurality of lenses, such as seven lenses as described above. By properly assigning the refractive power of each lens, the surface shape, the center thickness of each lens, and spaced distances on the optical axis between the lenses, the size and the sensitivity of the lens assembly may be effectively reduced, and the workability of the lens assembly may be improved, such that the camera lens assembly is more advantageous for production processing and may be applied to portable electronic products.

In the embodiments of the present disclosure, the surface of each lens is mostly an aspheric surface. At least one surface of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality.

Optionally, at least one of the object-side surface and the image-side surface of each of the first lens, the second lens, the third lens, the fourth lens, the fifth lens, the sixth lens, and the seventh lens may be aspheric. Optionally, the object-side surface and the image-side surface of each of the first lens, the second lens, the third lens, the fourth lens, the fifth lens, the sixth lens, and the seventh lens may be aspheric. Optionally, the object-side surface and the image-side surface of the second lens, and the object-side surface and the image-side surface of the third lens are aspheric. Optionally, the object-side surface and the image-side surface of the fourth lens, and the object-side surface and the image-side surface of the fifth lens are aspheric. Optionally, the image-side surface of the sixth lens and the object-side surface of the seventh lens are aspheric. Optionally, the object-side surface of the first lens, the object-side surface of the fourth lens, the object-side surface of the fifth lens and the object-side surface of the seventh lens are aspheric.

Some specific examples of an optical imaging lens assembly applicable to the above embodiment will be further described below with reference to the accompanying drawings.

Example 1

Figure 2B:
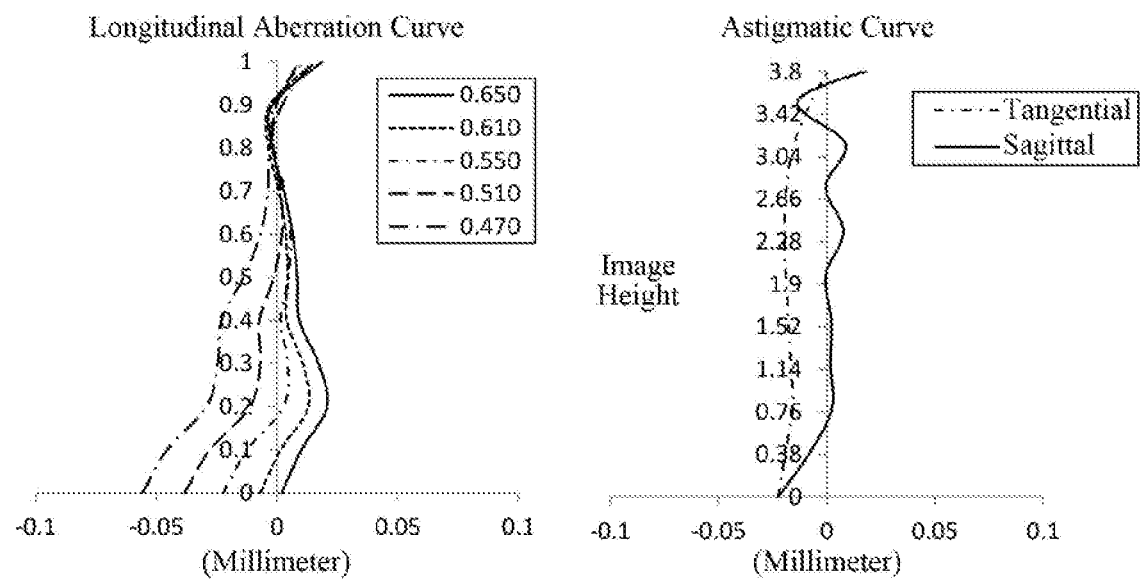
Figure 2C:
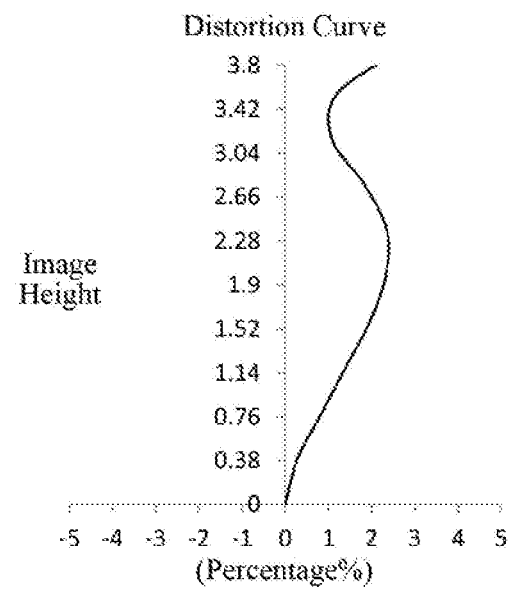

Referring to FIG. 1 to FIG. 2C, an optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 1 shows a table of basic parameters of the optical imaging lens assembly in this example as below, wherein the units for the radius of curvature, the thickness and the focal length are millimeter (mm).

TABLE 1

TTL = 5.97 mm, ImgH = 3.80 mm, Semi-FOV = 40.6°, f = 4.33 mm

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | aspheric | infinite | −0.4562 | | | | |
| S1 | aspheric | 2.5302 | 0.6169 | 1.55 | 56.1 | 6.54 | −0.0387 |
| S2 | aspheric | 7.9297 | 0.0651 | | | | 4.9431 |
| S3 | aspheric | 12.0000 | 0.2198 | 1.67 | 21.8 | 379.20 | −96.5697 |
| S4 | aspheric | 12.5000 | 0.0250 | | | | −57.8197 |
| S5 | aspheric | 2.0031 | 0.2000 | 1.66 | 21.5 | −18.68 | 0.1362 |
| S6 | aspheric | 1.6536 | 0.5725 | | | | −0.0077 |
| S7 | aspheric | −20.7020 | 0.5249 | 1.55 | 56.1 | 11.19 | 96.9086 |
| S8 | aspheric | −4.7605 | 0.0276 | | | | 6.0538 |
| S9 | aspheric | 2.7346 | 0.2619 | 1.67 | 21.8 | −37.67 | 0.1284 |
| S10 | aspheric | 2.3731 | 0.2961 | | | | 0.0434 |
| S11 | aspheric | −17.1166 | 0.9771 | 1.55 | 56.1 | 3.72 | 24.9630 |
| S12 | aspheric | −1.8522 | 0.7723 | | | | −1.4346 |
| S13 | aspheric | −5.8662 | 0.5500 | 1.55 | 56.1 | −2.95 | 4.5371 |
| S14 | aspheric | 2.2983 | 0.5574 | | | | −3.5570 |
| S15 | spherical | infinite | 0.1100 | 1.52 | 64.2 | | |
| S16 | spherical | infinite | 0.1918 | | | | |
| S17 | spherical | infinite | | | | | |

Where, TTL is an on-axis distance from the object-side surface S1 of the first lens E1 to the imaging plane S17 of the optical imaging lens assembly, ImgH is half of a diagonal length of an effective pixel area on the imaging plane S17, Semi-FOV is half of a maximal field-of-view of the optical imaging lens assembly and f is an effective focal length of the optical imaging lens assembly.

The object-side surface and the image-side surface of any one of the first lens E1 to the seventh lens E7 of the optical imaging lens assembly are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1-S14 in example 1.

FIG. 2A illustrates a longitudinal aberration curve of the optical imaging lens assembly according to example 1, representing deviations of focal points converged by light of different wavelengths after passing through the optical system. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different image heights. It can be seen from FIG. 2A to FIG. 2C that the optical imaging lens assembly provided in example 1 may achieve a good image quality.

Example 2

Figure 3:
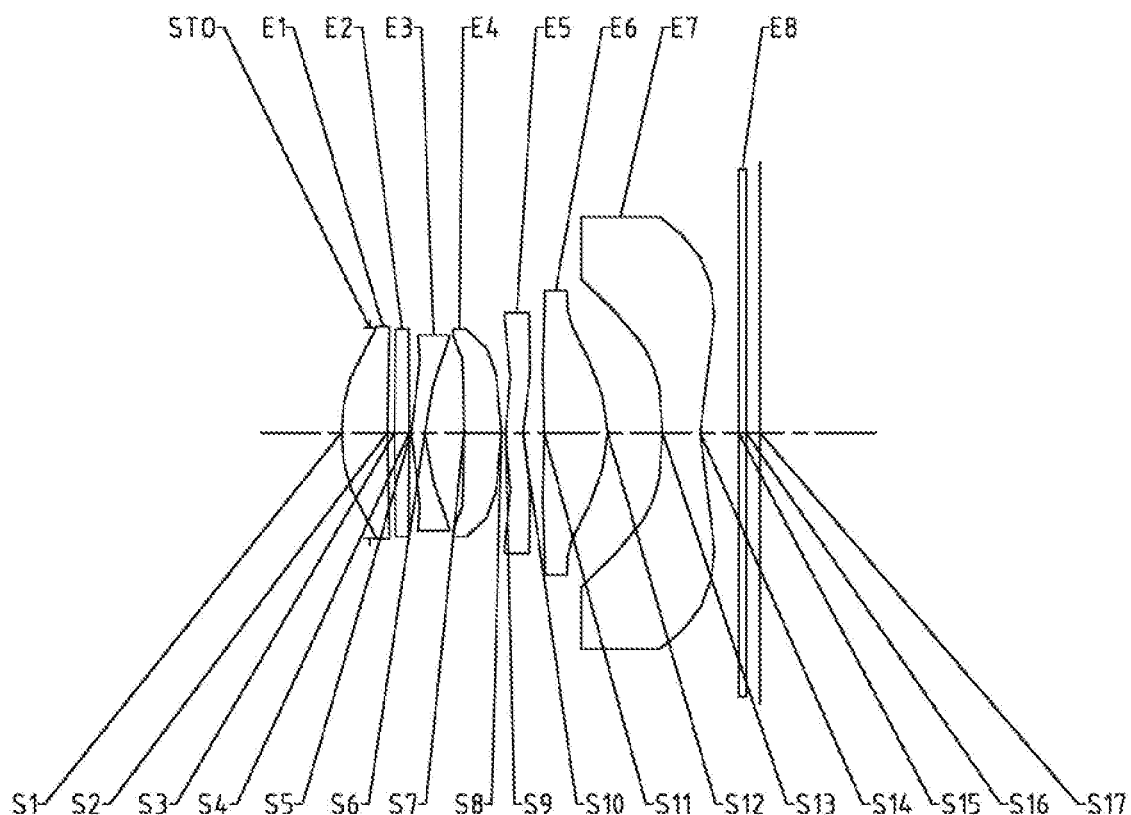
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4C. In this example and the following examples, for the purpose of brevity, the description of parts similar to those in example 1 will be omitted.

An optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a concave surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the

TABLE 2

| Surface number | A4 | A6 | A8 | A10 | A12 |
|---|---|---|---|---|---|
| S1 | −2.8785E−03 | 1.6785E−03 | −1.1124E−03 | −4.8175E−04 | −2.3751E−04 |
| S2 | −1.0456E−01 | 1.6680E−02 | −4.5586E−03 | 7.5700E−04 | 1.8469E−05 |
| S3 | 2.5111E−02 | −5.2426E−03 | 5.9432E−03 | 9.8672E−04 | 8.9933E−04 |
| S4 | 2.1606E−02 | −2.3770E−02 | 1.1724E−02 | −2.1477E−03 | 1.5404E−03 |
| S5 | 4.1197E−01 | 7.7928E−03 | 2.7000E−03 | −3.1364E−03 | 8.2000E−04 |
| S6 | −3.2230E−01 | 1.6992E−02 | −5.4062E−04 | −1.1702E−04 | 3.6155E−04 |
| S7 | −2.0570E−02 | −3.2030E−02 | −2.4188E−03 | 6.1955E−05 | 6.9925E−04 |
| S8 | −1.0033E−01 | −3.6773E−02 | −7.8166E−03 | 3.5798E−04 | −2.5641E−04 |
| S9 | −5.7712E−01 | 5.6238E−02 | 1.8244E−03 | 4.5896E−03 | −4.4617E−04 |
| S10 | −7.0912E−01 | 6.5185E−02 | 2.8458E−03 | 2.8652E−03 | 4.8209E−04 |
| S11 | 1.1047E−01 | 1.0563E−02 | 8.1284E−03 | −6.9266E−03 | 7.9300E−04 |
| S12 | 3.2993E−01 | 5.9667E−02 | 3.9143E−03 | −1.4930E−02 | −2.5759E−03 |
| S13 | −7.5671E−01 | 1.6865E−01 | 6.0195E−03 | 4.6602E−03 | −3.2930E−03 |
| S14 | −1.9490E+00 | 2.4898E−01 | −8.1961E−02 | 4.0980E−02 | −1.1535E−02 |

| Surface number | A14 | A16 | A18 | A20 |
|---|---|---|---|---|
| S1 | 4.1265E−05 | −2.1353E−05 | −4.6804E−06 | −1.0145E−05 |
| S2 | 2.0478E−04 | −6.6499E−05 | 4.0328E−05 | −8.3885E−06 |
| S3 | 3.9380E−04 | −6.6227E−05 | 1.1066E−04 | −2.6898E−05 |
| S4 | −3.0994E−05 | 1.0586E−04 | 1.0721E−04 | 2.5878E−05 |
| S5 | −1.8529E−04 | −5.2786E−05 | 5.0760E−05 | 1.2134E−05 |
| S6 | 1.7287E−04 | −6.4044E−05 | 4.0708E−05 | 6.1530E−07 |
| S7 | 3.5226E−04 | 1.1688E−04 | 4.3878E−05 | −5.2216E−06 |
| S8 | −1.3505E−04 | −2.7035E−05 | −2.0950E−05 | 1.1501E−05 |
| S9 | −9.9880E−04 | −8.1160E−05 | 6.4560E−05 | 3.8427E−05 |
| S10 | −9.3545E−04 | 4.7114E−05 | −6.6427E−05 | 5.0412E−06 |
| S11 | 2.3237E−04 | −1.0684E−04 | 4.3732E−05 | 2.4034E−05 |
| S12 | 1.0045E−03 | 6.8986E−04 | −6.6081E−05 | −1.8190E−05 |
| S13 | −2.9504E−03 | −1.2494E−03 | −1.3775E−04 | −3.6318E−05 |
| S14 | 2.6766E−03 | −1.9883E−03 | 8.0785E−04 | −1.9160E−04 | fourth lens E4 is a concave surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 3 shows a table of basic parameters of the optical imaging lens assembly in this example as below, wherein the units for the radius of curvature, the thickness and the focal length are millimeter (mm). Table 4 shows high-order coefficients applicable to each aspheric surface of the optical imaging lens assembly in this example, wherein the surface shape of each aspheric surface may be defined by the aforementioned formula (1).

TABLE 3

TTL = 6.09 mm, ImgH = 3.80 mm, Semi-FOV = 39.8°, f = 4.48 mm

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | aspheric | infinite | −0.4123 | | | | |
| S1 | aspheric | 2.5475 | 0.6708 | 1.55 | 56.1 | 6.07 | −0.0341 |
| S2 | aspheric | 9.9718 | 0.1012 | | | | 8.7180 |
| S3 | aspheric | −51.9288 | 0.2160 | 1.67 | 21.8 | 118.81 | 48.1446 |
| S4 | aspheric | −31.5232 | 0.0250 | | | | −99.0000 |
| S5 | aspheric | 2.1385 | 0.2000 | 1.66 | 21.5 | −14.13 | 0.2498 |
| S6 | aspheric | 1.6733 | 0.5680 | | | | −0.0267 |
| S7 | aspheric | −21.2158 | 0.5488 | 1.55 | 56.1 | 11.85 | 99.0000 |
| S8 | aspheric | −5.0038 | 0.0602 | | | | 5.5756 |
| S9 | aspheric | 2.7945 | 0.2544 | 1.67 | 21.8 | −36.73 | 0.1252 |
| S10 | aspheric | 2.4185 | 0.3049 | | | | 0.0384 |
| S11 | aspheric | −15.9595 | 0.9219 | 1.55 | 56.1 | 3.89 | 26.5344 |
| S12 | aspheric | −1.9121 | 0.8002 | | | | −1.4840 |
| S13 | aspheric | −6.6047 | 0.5500 | 1.55 | 56.1 | −3.01 | 5.3149 |
| S14 | aspheric | 2.2563 | 0.5605 | | | | −3.6041 |
| S15 | spherical | infinite | 0.1100 | 1.52 | 64.2 | | |
| S16 | spherical | infinite | 0.1961 | | | | |
| S17 | spherical | infinite | | | | | |

TABLE 4

| Surface number | A4 | A6 | A8 | A10 | A12 |
|---|---|---|---|---|---|
| S1 | −3.0246E−03 | 6.1194E−04 | −1.2499E−03 | −6.0910E−04 | −2.7213E−04 |
| S2 | −1.0165E−01 | 1.5228E−02 | −3.8911E−03 | 7.8829E−04 | 3.3484E−05 |
| S3 | 2.0515E−02 | −7.1571E−03 | 5.7044E−03 | 8.8678E−04 | 7.3680E−04 |
| S4 | 3.5723E−02 | −2.7278E−02 | 1.1668E−02 | −2.4545E−03 | 1.4741E−03 |
| S5 | 4.3609E−01 | 1.4063E−02 | 2.8911E−03 | −2.7512E−03 | 8.6878E−04 |
| S6 | −3.6561E−01 | 2.1039E−02 | −1.2241E−03 | 4.6537E−04 | 4.3042E−04 |
| S7 | −3.6376E−02 | 4.0569E−02 | −4.8756E−03 | −7.0403E−05 | 9.0933E−04 |
| S8 | −1.2417E−01 | 4.6530E−02 | −9.8886E−03 | 3.0289E−04 | −4.7648E−04 |
| S9 | −6.0250E−01 | 6.1096E−02 | 2.1063E−03 | 4.5689E−03 | −4.9753E−04 |
| S10 | −7.2408E−01 | 6.8239E−02 | 2.0503E−03 | 2.2433E−03 | 7.8283E−04 |
| S11 | 1.1768E−01 | 6.4415E−03 | 7.5623E−03 | −7.0002E−03 | 1.1600E−03 |
| S12 | 3.4365E−01 | 6.0112E−02 | 2.2656E−03 | −1.4073E−03 | −1.8156E−03 |
| S13 | −8.2253E−01 | 1.6863E−01 | −2.7899E−03 | 5.9398E−03 | −2.1654E−03 |
| S14 | −1.9680E+00 | 2.2355E−01 | −1.0228E−01 | 4.0580E−02 | −1.0465E−02 |

| Surface number | A14 | A16 | A18 | A20 |
|---|---|---|---|---|
| S1 | −8.4960E−05 | −3.7173E−05 | −1.9667E−05 | −1.1016E−05 |
| S2 | 1.9467E−04 | −7.4508E−05 | 2.7076E−05 | −3.2805E−06 |
| S3 | 4.0152E−04 | −7.7135E−05 | 1.1640E−04 | −3.2787E−05 |
| S4 | −1.2261E−04 | 9.2183E−05 | 8.6802E−05 | −5.7751E−06 |
| S5 | −2.2460E−04 | −6.9113E−05 | 2.9654E−05 | −1.8641E−05 |
| S6 | 2.6339E−04 | −4.6702E−05 | 6.1742E−05 | −1.0280E−05 |
| S7 | 5.6706E−04 | 2.5438E−04 | 9.9279E−05 | 1.8294E−05 |
| S8 | −1.3316E−04 | −9.1687E−05 | −8.2506E−06 | −7.7113E−06 |
| S9 | −9.5961E−04 | −1.1591E−04 | 1.0600E−04 | 1.6830E−05 |
| S10 | −7.0134E−04 | −4.3809E−05 | 4.8017E−05 | −1.5331E−05 |
| S11 | 3.0766E−04 | −1.9438E−05 | 1.1023E−05 | 3.3279E−05 |

TABLE 4-continued

| | | | | |
|---|---|---|---|---|
| S12 | 9.4076E−04 | 5.2455E−04 | −8.4098E−05 | 1.1423E−05 |
| S13 | −2.7322E−03 | −1.0690E−03 | −2.8414E−04 | −2.1009E−05 |
| S14 | 3.4427E−03 | −1.4275E−03 | 8.4371E−04 | 1.9898E−05 |

Figure 4A:
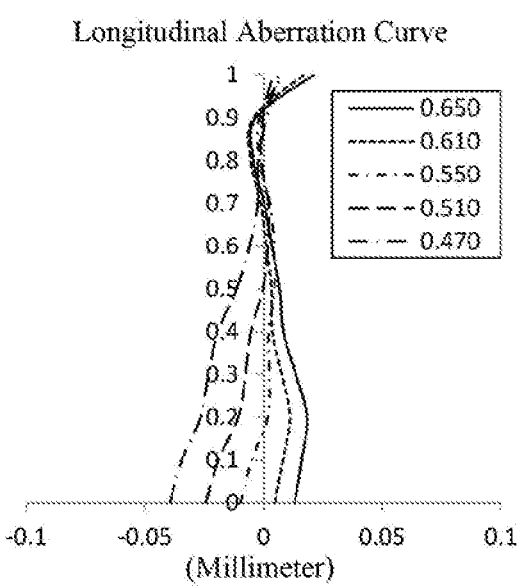
FIGS. 4A to 4C illustrate a longitudinal aberration curve, an astigmatic curve and a distortion curve according to Example 2 of the present disclosure, sequentially.
Figure 4B:
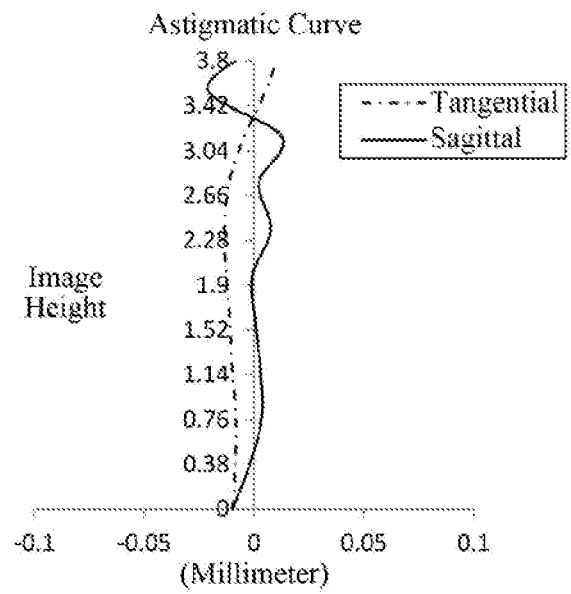
Figure 4C:
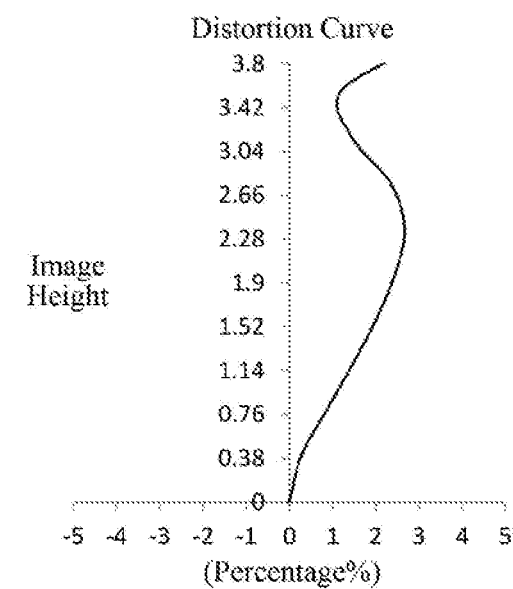

FIG. 4A illustrates a longitudinal aberration curve of the optical imaging lens assembly according to this example, representing deviations of focal points converged by light of different wavelengths after passing through the optical system. FIG. 4B illustrates an astigmatic curve of the optical imaging lens assembly according to this example, representing a curvature of a tangential plane and a curvature of a sagittal plane. FIG. 4C illustrates a distortion curve of the optical imaging lens assembly according to this example, representing amounts of distortion at different image heights. It can be seen from FIG. 4A to FIG. 4C that the optical imaging lens assembly provided in this example may achieve a good image quality.

Example 3

Figure 5:
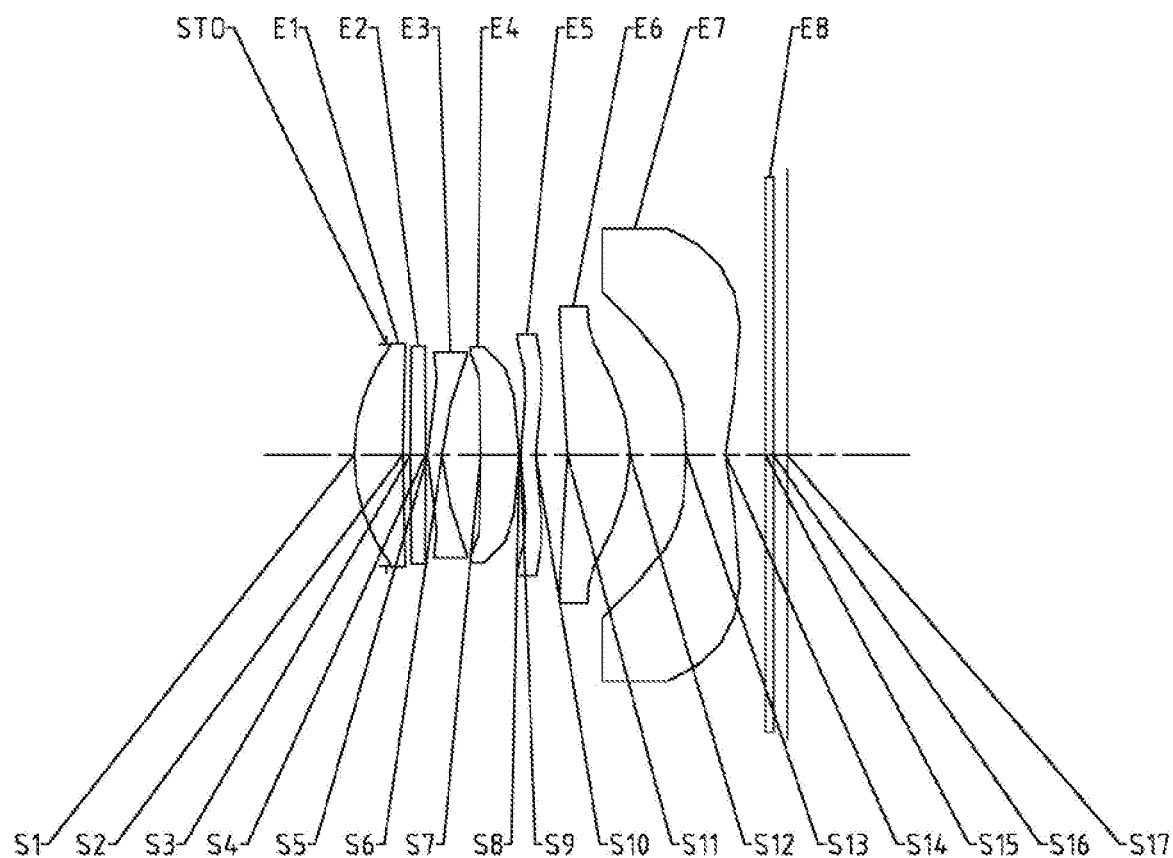
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6C. An optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a concave surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 5 shows a table of basic parameters of the optical imaging lens assembly in this example as below, wherein the units for the radius of curvature, the thickness and the focal length are millimeter (mm). Table 6 shows high-order coefficients applicable to each aspheric surface of the optical imaging lens assembly in this example, wherein the surface shape of each aspheric surface may be defined by the aforementioned formula (1).

TABLE 5

TTL = 6.08 mm, ImgH = 3.80 mm, Semi-FOV = 39.6°, f = 4.50 mm

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | aspheric | infinite | −0.4498 | | | | |
| S1 | aspheric | 2.5312 | 0.6823 | 1.55 | 56.1 | 6.01 | −0.0149 |
| S2 | aspheric | 10.0368 | 0.1089 | | | | 9.1726 |
| S3 | aspheric | −50.0000 | 0.2114 | 1.67 | 21.8 | 111.08 | 73.3675 |
| S4 | aspheric | −30.0000 | 0.0302 | | | | −98.3942 |
| S5 | aspheric | 2.1847 | 0.2000 | 1.66 | 21.5 | −13.65 | 0.2578 |
| S6 | aspheric | 1.6925 | 0.5398 | | | | −0.0196 |
| S7 | aspheric | −17.4849 | 0.5407 | 1.55 | 56.1 | 15.00 | −71.7337 |
| S8 | aspheric | −5.6380 | 0.0250 | | | | 7.5455 |
| S9 | aspheric | 2.8000 | 0.2101 | 1.67 | 21.8 | 65.47 | −0.0571 |
| S10 | aspheric | 2.9000 | 0.4440 | | | | 0.3032 |
| S11 | aspheric | −10.2633 | 0.8802 | 1.55 | 56.1 | 4.31 | 26.4076 |
| S12 | aspheric | −1.9728 | 0.7914 | | | | −1.4524 |
| S13 | aspheric | −6.7039 | 0.5500 | 1.55 | 56.1 | −3.03 | 5.7684 |
| S14 | aspheric | 2.2589 | 0.5593 | | | | −3.8531 |
| S15 | spherical | infinite | 0.1100 | 1.52 | 64.2 | | |
| S16 | spherical | infinite | 0.1950 | | | | |
| S17 | spherical | infinite | | | | | |

TABLE 6

| Surface number | A4 | A6 | A8 | A10 | A12 |
| --- | --- | --- | --- | --- | --- |
| S1 | −2.5283E−03 | 1.5133E−03 | −1.2846E−03 | −7.2388E−04 | −3.8308E−04 |
| S2 | −1.0381E−01 | 1.6110E−02 | −3.9320E−03 | 5.6989E−04 | 2.9862E−04 |
| S3 | 2.0624E−02 | −6.5280E−03 | 6.5139E−03 | 1.0844E−03 | 1.4011E−03 |
| S4 | 3.8109E−02 | −2.7328E−02 | 1.2222E−02 | −2.3185E−03 | 1.9483E−03 |
| S5 | −4.5860E−01 | 1.7443E−02 | 2.4040E−03 | −2.9143E−03 | 1.1584E−03 |
| S6 | −3.8391E−01 | 2.4766E−02 | −1.0161E−03 | 7.9265E−04 | 8.2746E−04 |
| S7 | −2.4171E−02 | −4.3243E−02 | 4.7467E−03 | 5.0317E−06 | 1.1144E−03 |
| S8 | −1.4858E−01 | −4.2880E−02 | −1.1692E−02 | 8.8011E−04 | −7.1527E−04 |
| S9 | −5.7594E−01 | 5.0230E−02 | 1.3821E−03 | 4.2692E−03 | 8.0672E−05 |
| S10 | −5.7757E−01 | 4.8227E−02 | 1.3156E−03 | −1.9985E−04 | 1.2976E−03 |
| S11 | 1.3131E−01 | 1.0095E−02 | 5.6067E−03 | −5.8846E−03 | 1.0642E−03 |
| S12 | 3.0693E−01 | 5.3043E−02 | 7.7503E−03 | −1.2420E−02 | −1.8319E−03 |
| S13 | −8.2738E−01 | 1.8403E−01 | −4.4619E−03 | 6.7990E−03 | −1.9110E−03 |
| S14 | −2.0215E+00 | 1.5794E−01 | −1.2110E−01 | 3.2192E−02 | −1.3853E−02 |

| Surface number | A14 | A16 | A18 | A20 |
| --- | --- | --- | --- | --- |
| S1 | −1.2735E−04 | −7.4973E−05 | −2.6288E−05 | −1.8898E−05 |
| S2 | 2.7189E−04 | 7.3079E−05 | 6.8135E−05 | 1.3417E−05 |
| S3 | 6.3781E−04 | 1.2756E−04 | 1.3044E−04 | −3.9084E−05 |
| S4 | 1.5602E−04 | 2.1000E−04 | 8.5746E−05 | −1.3261E−05 |
| S5 | −6.3801E−05 | −1.1240E−04 | −1.1077E−05 | 4.2669E−05 |
| S6 | 4.7613E−04 | 7.3319E−06 | 7.7119E−05 | −1.1176E−05 |
| S7 | 7.0144E−04 | 3.8933E−04 | 1.4458E−04 | 3.7830E−05 |
| S8 | −3.4383E−04 | 3.9898E−05 | −4.9957E−05 | 1.9308E−05 |
| S9 | −1.0183E−03 | 7.3435E−05 | 1.4894E−07 | 4.9719E−06 |
| S10 | −7.2664E−04 | 2.4752E−04 | −7.8711E−05 | −2.8173E−05 |
| S11 | 5.1745E−04 | 8.7185E−05 | 3.2516E−06 | 1.9077E−05 |
| S12 | 7.3720E−04 | 5.1073E−04 | −9.3317E−05 | −2.7226E−05 |
| S13 | −2.2982E−03 | −1.0751E−03 | −1.6250E−04 | 4.4915E−05 |
| S14 | 1.5199E−03 | −2.7988E−03 | 2.8655E−04 | −3.4394E−04 |

Figure 6A:
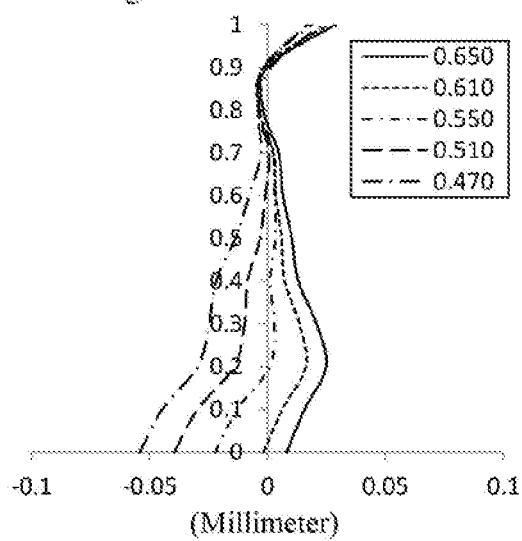
FIGS. 6A to 6C illustrate a longitudinal aberration curve, an astigmatic curve and a distortion curve according to Example 3 of the present disclosure, sequentially.
Figure 6B:
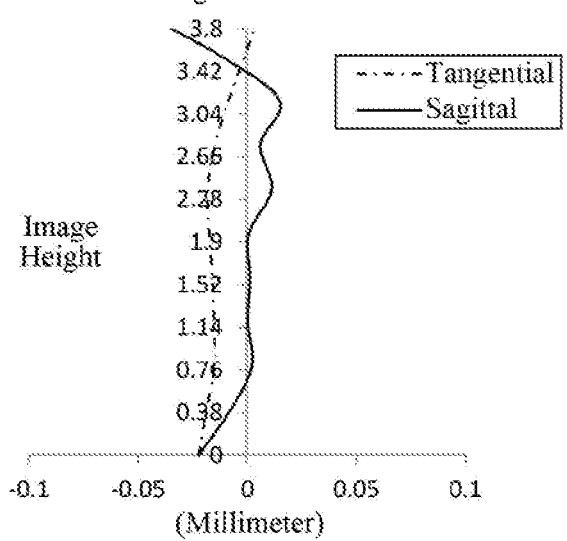
Figure 6C:
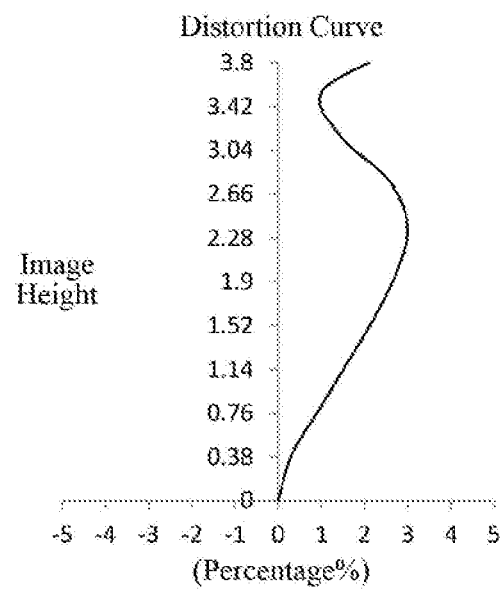

FIG. 6A illustrates a longitudinal aberration curve of the optical imaging lens assembly according to this example, representing deviations of focal points converged by light of different wavelengths after passing through the optical system. FIG. 6B illustrates an astigmatic curve of the optical imaging lens assembly according to this example, representing a curvature of a tangential plane and a curvature of a sagittal plane. FIG. 6C illustrates a distortion curve of the optical imaging lens assembly according to this example, representing amounts of distortion at different image heights. It can be seen from FIG. 6A to FIG. 6C that the optical imaging lens assembly provided in this example may achieve a good image quality.

Example 4

Figure 7:
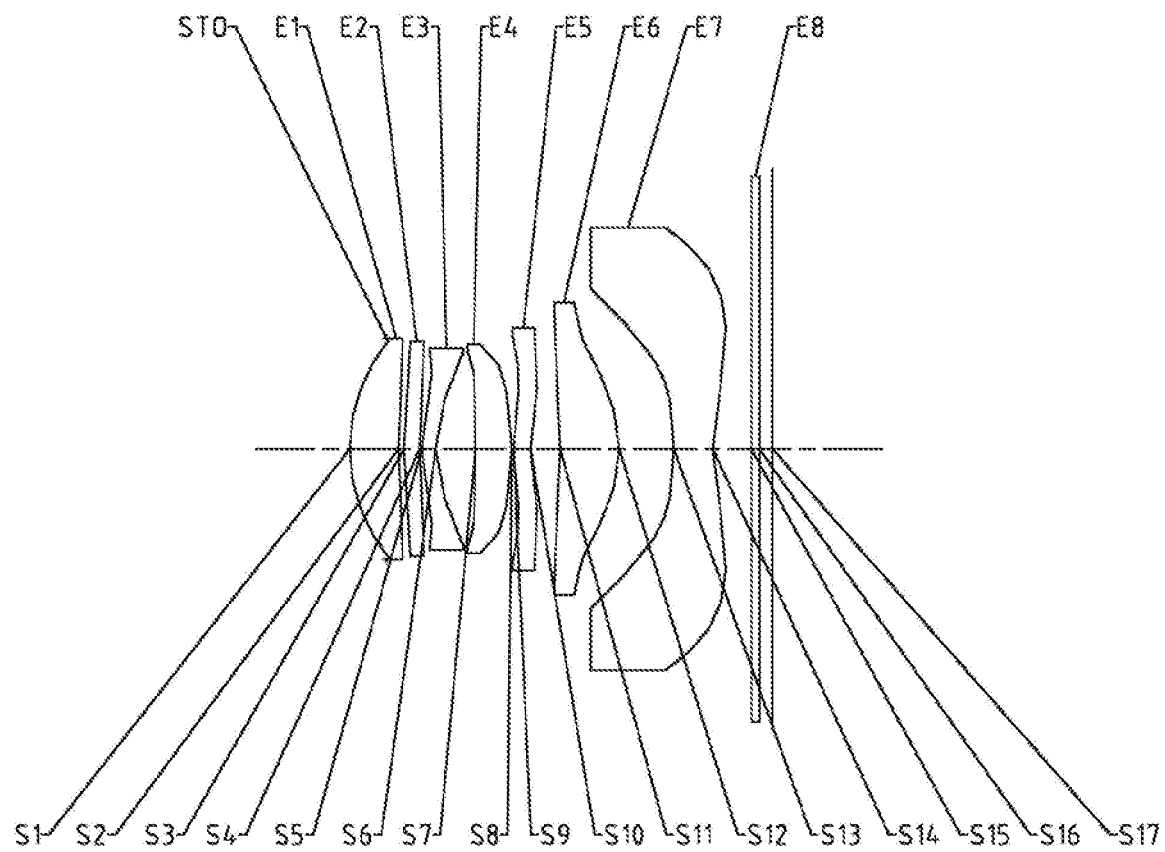
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8C. An optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1, and the stop STO may be located on the image side of the effective radius vertex of the object-side surface of the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 7 shows a table of basic parameters of the optical imaging lens assembly in this example as below, wherein the units for the radius of curvature, the thickness and the focal length are millimeter (mm). Table 8 shows high-order coefficients applicable to each aspheric surface of the optical imaging lens assembly in this example, wherein the surface shape of each aspheric surface may be defined by the aforementioned formula (1).

TABLE 7

TTL = 5.99 mm, ImgH = 3.80 mm, Semi-FOV = 39.9°, f = 4.45 mm

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | aspheric | infinite | −0.5204 | | | | |
| S1 | aspheric | 2.4179 | 0.6926 | 1.55 | 56.1 | 6.16 | −0.0346 |
| S2 | aspheric | 7.7422 | 0.0776 | | | | 4.3699 |
| S3 | aspheric | 26.5000 | 0.2218 | 1.67 | 21.8 | 160.61 | −99.0000 |
| S4 | aspheric | 35.0000 | 0.0250 | | | | 99.0000 |
| S5 | aspheric | 2.0415 | 0.2000 | 1.66 | 21.5 | −15.49 | 0.1823 |
| S6 | aspheric | 1.6342 | 0.5618 | | | | −0.0078 |
| S7 | aspheric | −14.4989 | 0.5175 | 1.55 | 56.1 | 15.36 | −86.1824 |
| S8 | aspheric | −5.3798 | 0.0250 | | | | 7.0440 |
| S9 | aspheric | 2.6800 | 0.2413 | 1.67 | 21.8 | 65.64 | 0.0072 |
| S10 | aspheric | 2.7500 | 0.4164 | | | | 0.2087 |
| S11 | aspheric | −9.1738 | 0.8373 | 1.55 | 56.1 | 4.19 | 17.6929 |
| S12 | aspheric | −1.8900 | 0.7752 | | | | −1.4435 |
| S13 | aspheric | −5.6760 | 0.5500 | 1.55 | 56.1 | −3.05 | 3.8571 |
| S14 | aspheric | 2.4323 | 0.5507 | | | | −3.7310 |
| S15 | spherical | infinite | 0.1100 | 1.52 | 64.2 | | |
| S16 | spherical | infinite | 0.1864 | | | | |
| S17 | spherical | infinite | | | | | |

TABLE 8

| Surface number | A4 | A6 | A8 | A10 | A12 |
|---|---|---|---|---|---|
| S1 | −3.6432E−03 | 1.6617E−03 | −1.1437E−03 | −6.7958E−04 | −3.6187E−04 |
| S2 | −1.1942E−01 | 1.9966E−02 | −4.3695E−03 | 8.8737E−04 | 3.6911E−04 |
| S3 | 2.5497E−02 | −5.8487E−03 | 7.0932E−03 | 1.4913E−03 | 1.5187E−03 |
| S4 | 3.3536E−02 | −2.8858E−02 | 1.2640E−02 | −2.3723E−03 | 1.7438E−03 |
| S5 | −4.6749E−01 | 1.3878E−02 | 1.9002E−03 | −3.7410E−03 | 8.4325E−04 |
| S6 | −3.6080E−01 | 2.1769E−02 | −1.3694E−03 | −1.5060E−04 | 4.0063E−04 |
| S7 | −1.0327E−02 | −3.3671E−02 | −2.3369E−03 | 4.0437E−04 | 9.3660E−04 |
| S8 | −1.2916E−01 | −2.9777E−02 | −1.1245E−02 | 1.2291E−03 | −3.6856E−04 |
| S9 | −5.8336E−01 | 5.3199E−02 | 9.8211E−04 | 4.4156E−03 | 1.6736E−04 |
| S10 | −6.0159E−01 | 4.9489E−02 | 4.7736E−03 | 7.6435E−04 | 1.5277E−03 |
| S11 | 1.8450E−01 | 8.8602E−03 | 6.6442E−03 | −6.3829E−03 | 1.3779E−03 |
| S12 | 3.1648E−01 | 5.0470E−02 | 3.7006E−03 | −1.4709E−02 | −1.6962E−03 |
| S13 | −7.2112E−01 | 1.6856E−01 | 8.4916E−04 | 3.3774E−03 | −2.7328E−03 |
| S14 | −1.9577E+00 | 2.0146E−01 | −8.5481E−02 | 3.7877E−02 | −9.4701E−03 |

| Surface number | A14 | A16 | A18 | A20 |
|---|---|---|---|---|
| S1 | −1.0417E−04 | 4.4420E−05 | −1.0514E−05 | −1.0299E−05 |
| S2 | 3.6640E−04 | 5.7551E−05 | 9.2066E−05 | 8.8220E−06 |
| S3 | 7.1087E−04 | 1.0388E−04 | 1.7432E−04 | −2.4938E−05 |
| S4 | 1.0412E−04 | 1.9686E−04 | 1.2254E−04 | 1.6230E−05 |
| S5 | −1.3425E−04 | −6.5788E−05 | 2.6861E−05 | −1.4795E−05 |
| S6 | 2.6041E−04 | −5.7976E−05 | 4.6260E−05 | −1.2340E−05 |
| S7 | 4.3893E−04 | 1.9040E−04 | 6.0867E−05 | 5.8336E−06 |
| S8 | −2.4348E−04 | 3.2303E−05 | −5.7901E−05 | 2.9671E−05 |
| S9 | −1.1512E−03 | 1.0974E−05 | −1.7454E−05 | 5.6485E−05 |
| S10 | −1.1571E−03 | 1.6416E−04 | −1.1972E−04 | 2.4278E−05 |
| S11 | 4.1042E−04 | −2.4906E−05 | 2.5396E−05 | 2.6208E−05 |
| S12 | 1.1827E−03 | 6.4141E−04 | −1.0941E−04 | −1.4367E−05 |
| S13 | −2.8561E−03 | −8.9863E−04 | −7.6517E−05 | 6.3823E−06 |
| S14 | 1.6591E−03 | −1.5032E−03 | 5.3495E−04 | 4.8759E−05 |

Figure 8A:
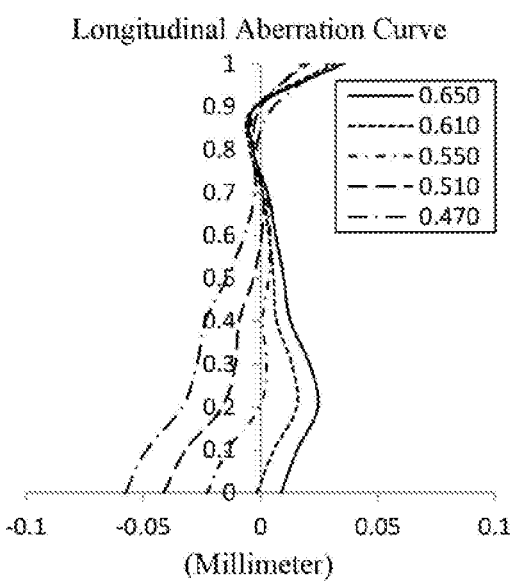
FIGS. 8A to 8C illustrate a longitudinal aberration curve, an astigmatic curve and a distortion curve according to Example 4 of the present disclosure, sequentially.
Figure 8B:
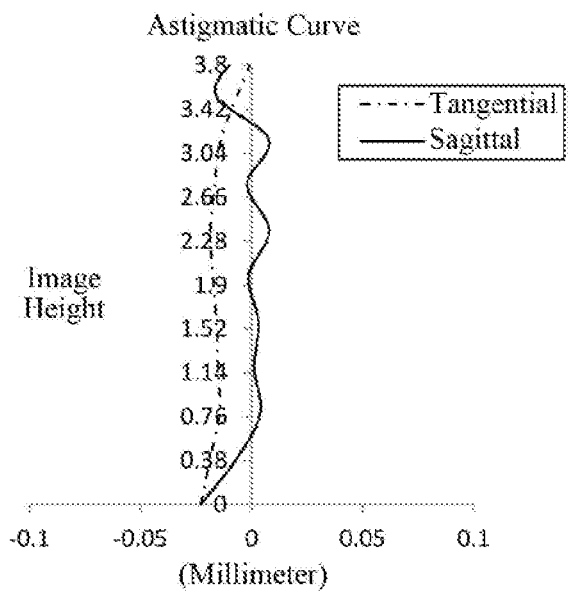
Figure 8C:
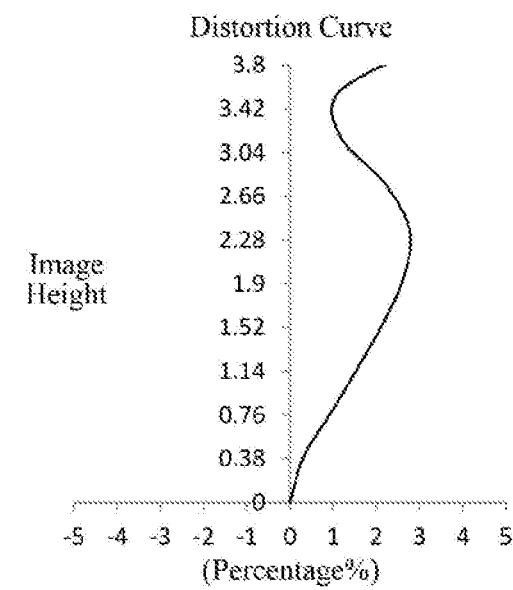

FIG. 8A illustrates a longitudinal aberration curve of the optical imaging lens assembly according to this example, representing deviations of focal points converged by light of different wavelengths after passing through the optical system. FIG. 8B illustrates an astigmatic curve of the optical imaging lens assembly according to this example, representing a curvature of a tangential plane and a curvature of a sagittal plane. FIG. 8C illustrates a distortion curve of the optical imaging lens assembly according to this example, representing amounts of distortion at different image heights. It can be seen from FIG. 8A to FIG. 8C that the optical imaging lens assembly provided in this example may achieve a good image quality.

Example 5

Figure 9:
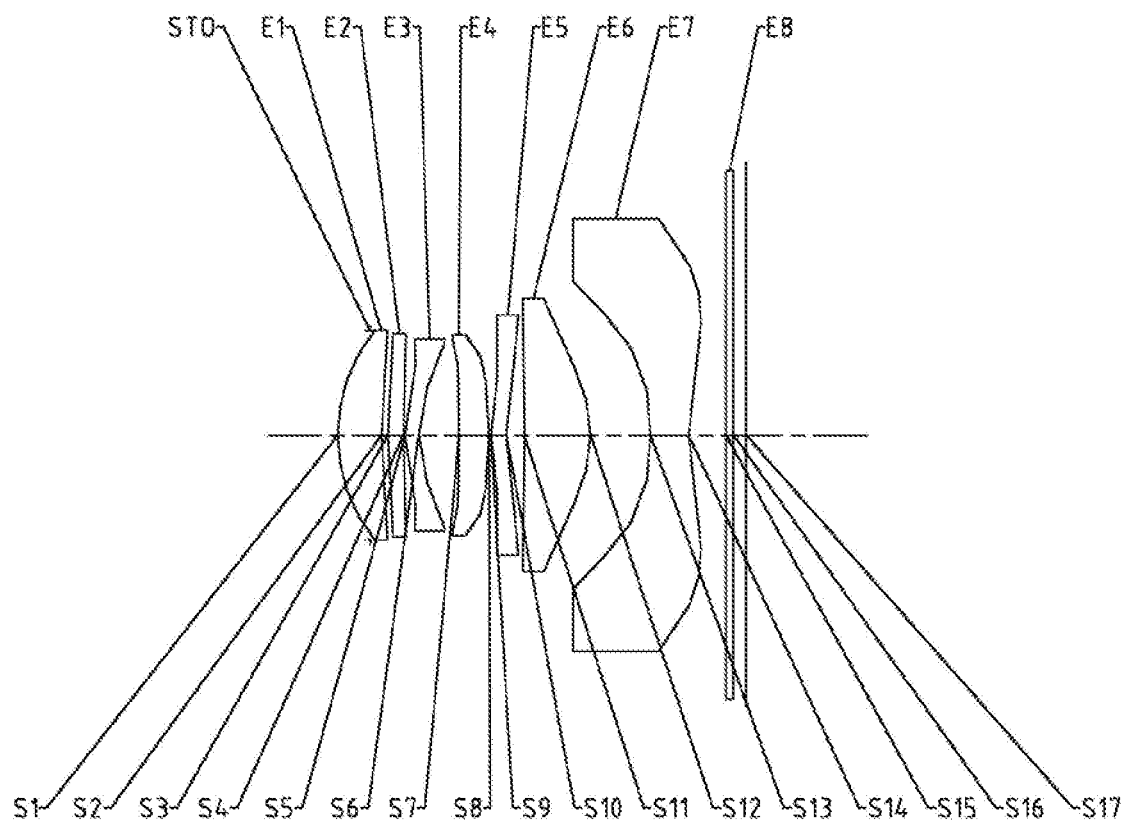
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10C. Referring to FIG. 9, an optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 9 shows a table of basic parameters of the optical imaging lens assembly in this example as below, wherein the units for the radius of curvature, the thickness and the focal length are millimeter (mm). Table 10 shows high-order coefficients applicable to each aspheric surface of the optical imaging lens assembly in this example, wherein the surface shape of each aspheric surface may be defined by the aforementioned formula (1).

TABLE 9

TTL = 5.98 mm, ImgH = 3.80 mm, Semi-FOV = 40.0°, f = 4.43 mm

| Surface number | Surface type | Radius of curvature | Thickness/ Distance | Refractive index | Abbe number | Focal length | Conic coefficient |
|---|---|---|---|---|---|---|---|
| OBJ | spherical | infinite | infinite | | | | |
| STO | aspheric | infinite | −0.4755 | | | | |
| S1 | aspheric | 2.4047 | 0.6445 | 1.55 | 56.1 | 6.73 | −0.0575 |
| S2 | aspheric | 6.3029 | 0.0914 | | | | 3.1287 |
| S3 | aspheric | 26.5000 | 0.2258 | 1.67 | 21.8 | 329.30 | −62.1541 |
| S4 | aspheric | 30.0000 | 0.0250 | | | | 60.0224 |
| S5 | aspheric | 1.9172 | 0.2001 | 1.66 | 21.5 | −23.04 | 0.0944 |
| S6 | aspheric | 1.6311 | 0.5918 | | | | −0.0066 |
| S7 | aspheric | −14.0000 | 0.4386 | 1.55 | 56.1 | 21.78 | −99.0000 |
| S8 | aspheric | −6.5000 | 0.0263 | | | | 6.7840 |
| S9 | aspheric | 2.3508 | 0.2282 | 1.67 | 21.8 | 124.13 | 0.0203 |
| S10 | aspheric | 2.3245 | 0.2619 | | | | 0.0203 |
| S11 | aspheric | −14.3461 | 0.9719 | 1.55 | 56.1 | 3.94 | 25.5922 |
| S12 | aspheric | −1.9143 | 0.8748 | | | | −1.3560 |
| S13 | aspheric | −4.8813 | 0.5617 | 1.55 | 56.1 | −3.14 | 2.3587 |
| S14 | aspheric | 2.7521 | 0.5470 | | | | −3.9998 |
| S15 | spherical | infinite | 0.1100 | 1.52 | 64.2 | | |
| S16 | spherical | infinite | 0.1827 | | | | |
| S17 | spherical | infinite | | | | | |

TABLE 10

| Surface number | A4 | A6 | A8 | A10 | A12 |
|---|---|---|---|---|---|
| S1 | −4.8167E−03 | 2.3939E−03 | −5.7964E−04 | −3.3263E−04 | −1.6180E−04 |
| S2 | −1.1479E−01 | 1.6079E−02 | −2.8231E−03 | 9.9849E−04 | −1.2008E−06 |
| S3 | 3.1161E−02 | −1.1646E−02 | 4.8277E−03 | 9.1501E−04 | 4.5672E−04 |
| S4 | 2.5339E−02 | −2.9197E−02 | 8.5842E−03 | −1.6103E−03 | 8.9791E−04 |
| S5 | 4.4046E−01 | 5.9395E−03 | 1.0549E−03 | −2.5571E−03 | 5.6286E−04 |
| S6 | −3.1610E−01 | 1.4254E−02 | −8.1830E−04 | −6.5509E−04 | 1.5950E−04 |
| S7 | 1.2862E−03 | −2.8742E−02 | 2.4438E−04 | −4.2354E−04 | 3.9052E−04 |
| S8 | −8.4079E−02 | −3.4899E−02 | −4.4033E−03 | 1.0443E−04 | −1.0975E−04 |
| S9 | −6.0970E−01 | 5.5930E−02 | 1.1700E−04 | 3.0884E−03 | 4.3610E−04 |
| S10 | −6.0970E−01 | 5.5930E−02 | 1.1700E−04 | 3.0884E−03 | 4.3610E−04 |
| S11 | 1.1430E−01 | −5.3841E−03 | 6.1151E−03 | −4.5205E−03 | −2.9496E−04 |
| S12 | 2.3468E−01 | 3.1856E−02 | 3.0876E−03 | −9.6206E−03 | −3.1672E−03 |
| S13 | −5.8269E−01 | 1.3896E−01 | 6.1414E−03 | −2.8322E−04 | −3.2232E−03 |
| S14 | −1.7372E+00 | 2.2844E−01 | −5.4589E−02 | 2.8625E−02 | −9.5248E−03 |

TABLE 10-continued

| Surface number | A14 | A16 | A18 | A20 |
|---|---|---|---|---|
| S1 | −3.6606E−05 | −7.6490E−06 | −6.5859E−06 | −1.1487E−06 |
| S2 | 2.3917E−04 | −1.2239E−04 | −7.3834E−06 | −1.8523E−05 |
| S3 | 3.3296E−04 | −1.5822E−04 | 6.7784E−05 | −1.6864E−05 |
| S4 | −8.1600E−05 | 2.5540E−05 | 1.0007E−04 | 2.3626E−05 |
| S5 | −1.3594E−04 | 4.2078E−05 | 5.0755E−05 | 2.5050E−05 |
| S6 | 8.5278E−05 | −5.5854E−05 | 2.0289E−05 | 5.2394E−06 |
| S7 | 8.0928E−05 | 4.3668E−05 | 6.2395E−06 | 3.0305E−06 |
| S8 | −1.1665E−04 | 1.2509E−05 | −3.7837E−05 | 7.5171E−06 |
| S9 | −6.9917E−04 | 9.8625E−06 | 1.5874E−05 | 2.3756E−05 |
| S10 | −6.9917E−04 | 9.8625E−06 | 1.5874E−05 | 2.3756E−05 |
| S11 | −4.4539E−04 | −1.2471E−04 | 2.4986E−05 | 6.5292E−05 |
| S12 | −7.1689E−04 | 1.9864E−04 | 9.5684E−05 | 9.7609E−05 |
| S13 | −2.4236E−03 | −5.6861E−04 | 6.8289E−06 | −4.7009E−05 |
| S14 | 2.7320E−04 | −7.9830E−04 | 3.5742E−04 | −1.6267E−05 |

Figure 10A:
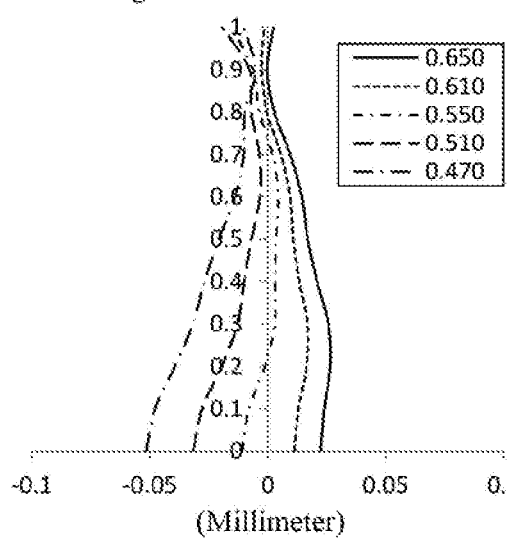
FIGS. 10A to 10C illustrate a longitudinal aberration curve, an astigmatic curve and a distortion curve according to Example 5 of the present disclosure, sequentially.
Figure 10B:
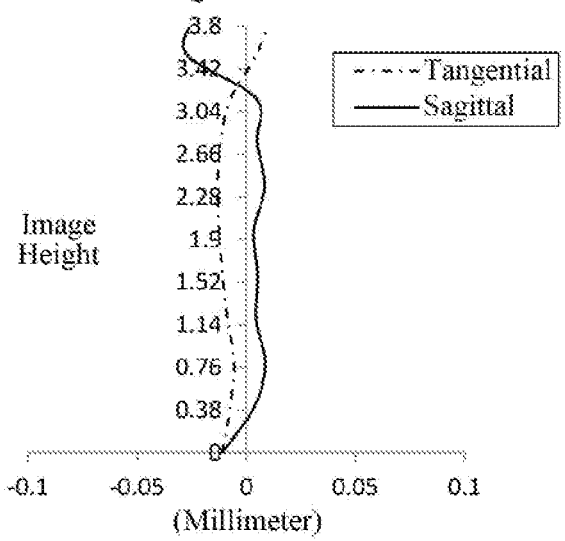
Figure 10C:
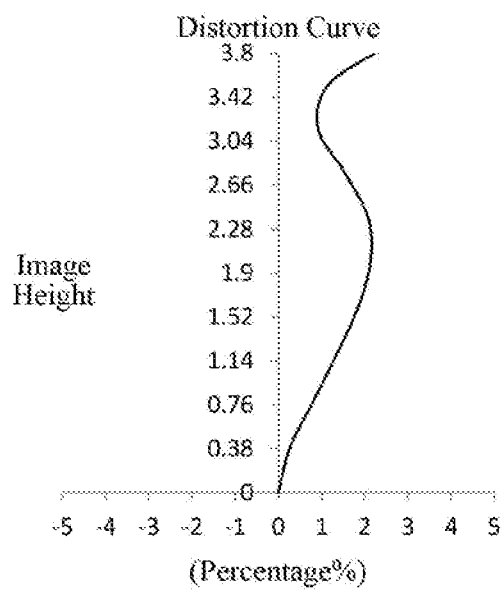

FIG. 10A illustrates a longitudinal aberration curve of the optical imaging lens assembly according to this example, representing deviations of focal points converged by light of different wavelengths after passing through the optical system. FIG. 10B illustrates an astigmatic curve of the optical imaging lens assembly according to this example, representing a curvature of a tangential plane and a curvature of a sagittal plane. FIG. 10C illustrates a distortion curve of the optical imaging lens assembly according to this example, representing amounts of distortion at different image heights. It can be seen from FIG. 10A to FIG. 10C that the optical imaging lens assembly provided in this example may achieve a good image quality.

Example 6

Figure 11:
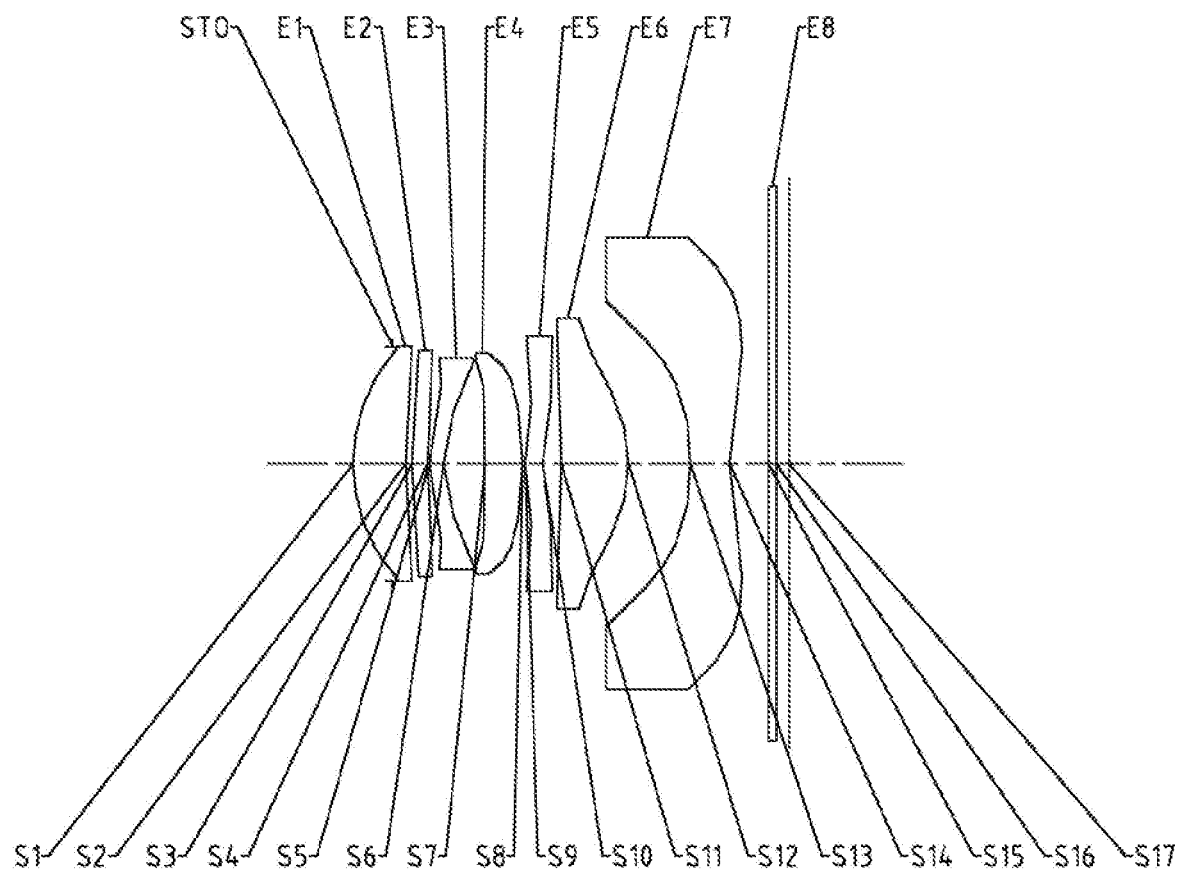
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12C. Referring to FIG. 11, an optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 11 shows a table of basic parameters of the optical imaging lens assembly in this example as below, wherein the units for the radius of curvature, the thickness and the focal length are millimeter (mm). Table 12 shows high-order coefficients applicable to each aspheric surface of the optical imaging lens assembly in this example, wherein the surface shape of each aspheric surface may be defined by the aforementioned formula (1).

TABLE 11

| TTL = 6.09 mm, ImgH = 3.80 mm, Semi-FOV = 39.5°, f = 4.50 mm | | | | | | | |
|---|---|---|---|---|---|---|---|
| | | | | Material | | | |
| Surface number | Surface type | Radius of curvature | Thickness/ Distance | Refractive index | Abbe number | Focal length | Conic coefficient |
| OBJ | spherical | infinite | infinite | | | | |
| STO | aspheric | infinite | −0.5506 | | | | |
| S1 | aspheric | 2.4334 | 0.7354 | 1.55 | 56.1 | 6.57 | 0.0059 |
| S2 | aspheric | 6.7552 | 0.0891 | | | | 3.1282 |
| S3 | aspheric | 26.5000 | 0.2164 | 1.67 | 21.8 | 329.65 | −99.0000 |
| S4 | aspheric | 30.0000 | 0.0250 | | | | 99.0000 |
| S5 | aspheric | 1.9265 | 0.2000 | 1.66 | 21.5 | −21.73 | 0.1299 |
| S6 | aspheric | 1.6274 | 0.5749 | | | | −0.0153 |
| S7 | aspheric | −16.4521 | 0.5222 | 1.55 | 56.1 | 13.32 | −64.1530 |
| S8 | aspheric | −5.1001 | 0.0421 | | | | 3.5765 |

TABLE 11-continued

TTL = 6.09 mm, ImgH = 3.80 mm, Semi-FOV = 39.5°, f = 4.50 mm

| Surface number | Surface type | Radius of curvature | Thickness/ Distance | Material Refractive index | Abbe number | Focal length | Conic coefficient |
|---|---|---|---|---|---|---|---|
| S9  | aspheric  | 2.6569   | 0.2440 | 1.67 | 21.8 | −47.05 | 0.1030  |
| S10 | aspheric  | 2.3605   | 0.2583 |      |      |        | 0.0288  |
| S11 | aspheric  | −12.8455 | 0.9403 | 1.55 | 56.1 | 4.04   | 27.5392 |
| S12 | aspheric  | −1.9319  | 0.8613 |      |      |        | −1.3399 |
| S13 | aspheric  | −5.0554  | 0.5500 | 1.55 | 56.1 | −3.18  | 2.7263  |
| S14 | aspheric  | 2.7494   | 0.5432 |      |      |        | −3.8438 |
| S15 | spherical | infinite | 0.1100 | 1.52 | 64.2 |        |         |
| S16 | spherical | infinite | 0.1788 |      |      |        |         |
| S17 | spherical | infinite |        |      |      |        |         |

TABLE 12

| Surface number | A4 | A6 | A8 | A10 | A12 |
|---|---|---|---|---|---|
| S1  | −3.6244E−04 | 3.4651E−03  | −2.5572E−04 | −2.8765E−04 | −2.2175E−04 |
| S2  | −1.2554E−01 | 1.9241E−02  | −3.6944E−03 | 4.2549E−04  | 6.1385E−05  |
| S3  | 2.6739E−02  | −9.7168E−03 | 6.1183E−03  | 3.8760E−04  | 8.8681E−05  |
| S4  | 3.5324E−02  | −2.8294E−02 | 1.1044E−02  | −2.1958E−03 | 1.1709E−03  |
| S5  | −4.8340E−01 | 9.7824E−03  | 1.5332E−03  | −3.0573E−03 | 4.3561E−04  |
| S6  | −3.5121E−01 | 1.4907E−02  | −1.1107E−02 | −6.8806E−04 | 7.6044E−05  |
| S7  | −1.6063E−02 | −3.3231E−02 | −2.0597E−03 | 1.5598E−04  | 6.7370E−05  |
| S8  | −8.7272E−02 | −3.9064E−02 | −6.5516E−03 | 6.1243E−04  | −7.5392E−05 |
| S9  | −6.0792E−01 | 6.0745E−02  | 1.3363E−03  | 4.1780E−03  | −2.5172E−04 |
| S10 | −7.2380E−01 | 6.5657E−02  | 2.6088E−03  | 2.2051E−03  | 5.3565E−04  |
| S11 | 9.9026E−02  | −2.3445E−03 | 8.2019E−03  | −4.7408E−03 | −1.8499E−04 |
| S12 | 2.3436E−01  | 3.5254E−02  | 4.0944E−03  | −8.3189E−03 | −2.4822E−03 |
| S13 | −6.1997E−01 | 1.3790E−01  | 2.1447E−03  | 4.8803E−03  | −2.4296E−03 |
| S14 | −1.8287E+00 | 1.9701E−01  | −6.7216E−02 | 3.6052E−02  | −8.0815E−03 |

| Surface number | A14 | A16 | A18 | A20 |
|---|---|---|---|---|
| S1  | −6.5493E−05 | −3.2830E−05 | −5.7858E−06 | −1.2750E−05 |
| S2  | 2.3413E−04  | −2.8549E−05 | 1.9263E−05  | 6.1379E−06  |
| S3  | 4.4700E−04  | −7.3583E−05 | 8.7879E−05  | −1.6267E−06 |
| S4  | −6.9094E−05 | −2.0497E−05 | 7.0109E−05  | 3.0364E−05  |
| S5  | −1.0061E−04 | −1.3701E−04 | 2.2489E−05  | 6.8977E−06  |
| S6  | 1.3266E−04  | −8.6443E−05 | 2.3015E−05  | 5.1127E−06  |
| S7  | 3.1213E−04  | 9.9419E−05  | 3.9550E−05  | −6.8936E−07 |
| S8  | −7.0546E−05 | −6.1291E−05 | −1.2613E−05 | −7.0370E−06 |
| S9  | −9.1246E−04 | −1.4238E−04 | 1.0464E−04  | 1.6093E−05  |
| S10 | −7.5361E−04 | −1.2266E−04 | −2.1620E−05 | 1.1435E−05  |
| S11 | 1.0363E−04  | −2.1439E−04 | −3.5024E−05 | 4.0563E−05  |
| S12 | −3.6954E−04 | 1.5683E−04  | −3.8075E−05 | 4.5516E−05  |
| S13 | −2.1446E−03 | −8.9640E−04 | −6.9783E−05 | −4.5764E−06 |
| S14 | 1.4563E−03  | −1.3588E−03 | 4.9877E−04  | 2.8383E−06  |

Figure 12A:
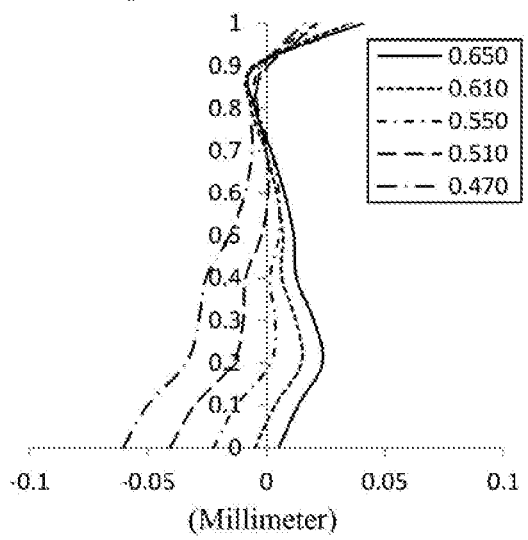
FIGS. 12A to 12C illustrate a longitudinal aberration curve, an astigmatic curve and a distortion curve according to Example 6 of the present disclosure, sequentially.
Figure 12B:
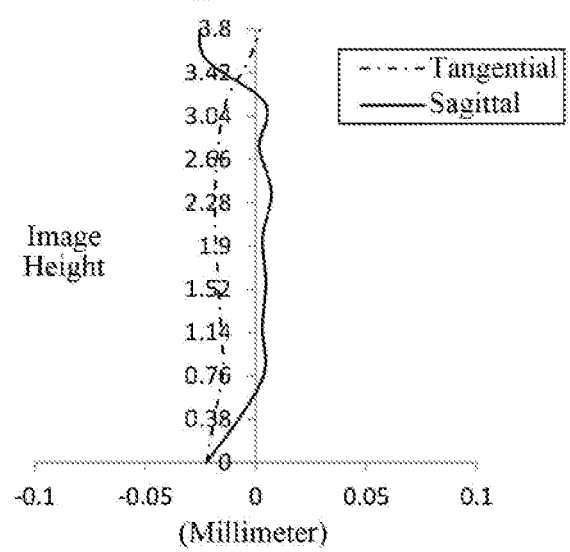
Figure 12C:
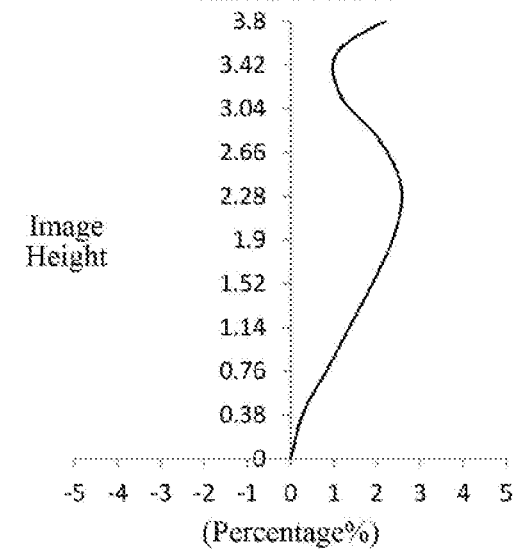

FIG. 12A illustrates a longitudinal aberration curve of the optical imaging lens assembly according to this example, representing deviations of focal points converged by light of different wavelengths after passing through the optical system. FIG. 12B illustrates an astigmatic curve of the optical imaging lens assembly according to this example, representing a curvature of a tangential plane and a curvature of a sagittal plane. FIG. 12C illustrates a distortion curve of the optical imaging lens assembly according to this example, representing amounts of distortion at different image heights. It can be seen from FIG. 12A to FIG. 12C that the optical imaging lens assembly provided in this example may achieve a good image quality.

Example 7

Figure 13:
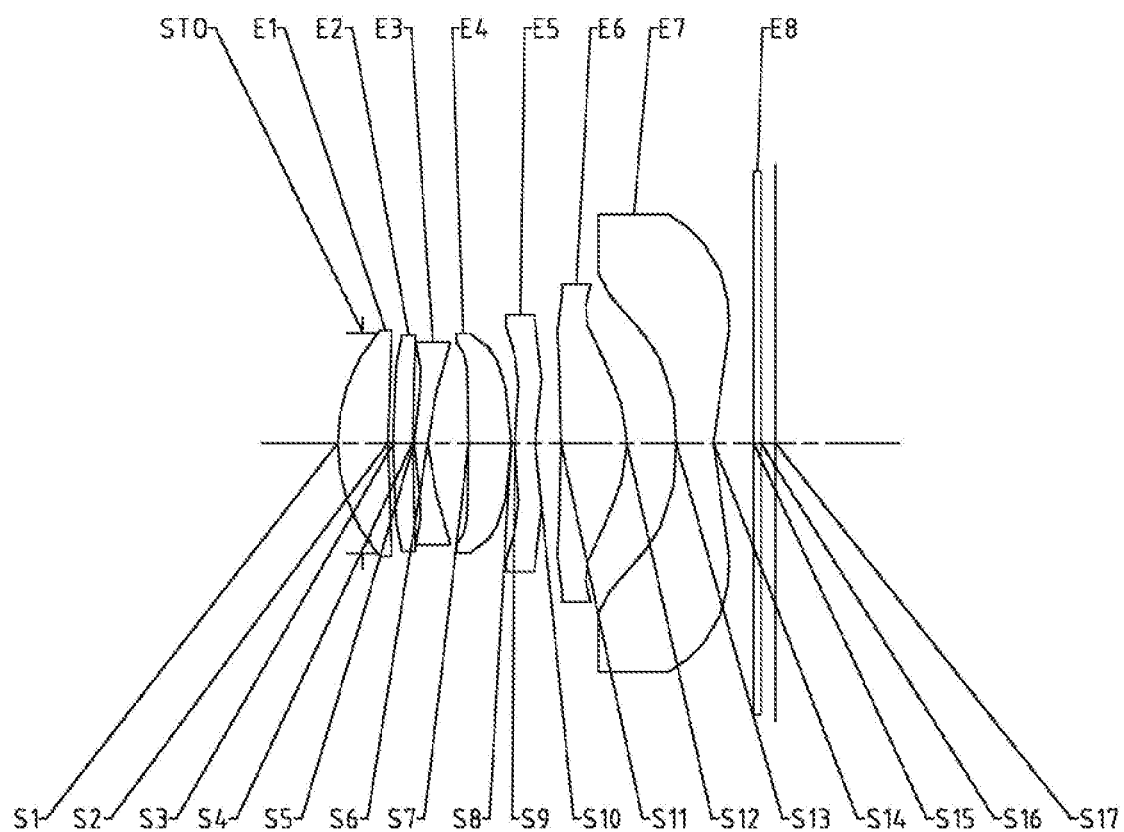
FIG. 13 illustrates a schematic structural view of an optical imaging lens assembly according to Example 7 of the present disclosure.

An optical imaging lens assembly according to example 7 of the present disclosure is described below with reference to FIG. 13 to FIG. 14C. Referring to FIG. 13, an optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 13 shows a table of basic parameters of the optical imaging lens assembly in this example as below, wherein the units for the radius of curvature, the thickness and the focal length are millimeter (mm). Table 14 shows high-order coefficients applicable to each aspheric surface of the optical imaging lens assembly in this example, wherein the surface shape of each aspheric surface may be defined by the aforementioned formula (1).

TABLE 13

TTL = 6.42 mm, ImgH = 3.90 mm, Semi-FOV = 39.1°, f = 4.70 mm

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | aspheric | infinite | −0.3709 | | | | |
| S1 | aspheric | 2.5741 | 0.7408 | 1.55 | 56.1 | 6.82 | 0.1501 |
| S2 | aspheric | 7.4818 | 0.0781 | | | | 5.0584 |
| S3 | aspheric | 12.3200 | 0.2808 | 1.67 | 21.8 | 18.14 | −99.0000 |
| S4 | aspheric | −1200.0000 | 0.0250 | | | | −99.0000 |
| S5 | aspheric | 2.5817 | 0.2000 | 1.66 | 21.5 | −9.34 | 0.3801 |
| S6 | aspheric | 1.7611 | 0.5951 | | | | −0.0647 |
| S7 | aspheric | −22.9596 | 0.6268 | 1.55 | 56.1 | 10.56 | 99.0000 |
| S8 | aspheric | −4.6521 | 0.0557 | | | | 4.8854 |
| S9 | aspheric | 3.2956 | 0.2988 | 1.67 | 21.8 | −31.02 | 0.0508 |
| S10 | aspheric | 2.7422 | 0.3775 | | | | 0.0374 |
| S11 | aspheric | −17.0361 | 0.9680 | 1.55 | 56.1 | 3.90 | 36.6274 |
| S12 | aspheric | −1.9284 | 0.7209 | | | | −1.5650 |
| S13 | aspheric | −6.7928 | 0.5500 | 1.55 | 56.1 | −3.01 | 3.8696 |
| S14 | aspheric | 2.2296 | 0.5861 | | | | −3.8769 |
| S15 | spherical | infinite | 0.1100 | 1.52 | 64.2 | | |
| S16 | spherical | infinite | 0.2108 | | | | |
| S17 | spherical | infinite | | | | | |

TABLE 14

| Surface number | A4 | A6 | A8 | A10 | A12 |
|---|---|---|---|---|---|
| S1 | 1.0908E−02 | 3.8942E−03 | −1.4381E−03 | −1.2691E−03 | −7.6421E−04 |
| S2 | −1.2734E−01 | 2.0088E−02 | −6.5883E−03 | −1.3452E−03 | −6.2573E−04 |
| S3 | 1.0716E−02 | 9.4950E−03 | 6.3767E−03 | 8.6868E−04 | 6.1665E−04 |
| S4 | 4.8684E−02 | −2.5849E−02 | 1.5285E−02 | −1.3475E−03 | 2.4931E−03 |
| S5 | −4.6744E−01 | 1.6376E−02 | 6.1513E−03 | −2.0015E−03 | 1.9460E−03 |
| S6 | −4.1528E−01 | 2.8674E−02 | −1.9325E−03 | 1.3065E−03 | 6.8413E−04 |
| S7 | −4.2124E−02 | −4.7151E−02 | −6.7369E−03 | −2.9765E−04 | 9.7012E−04 |
| S8 | −1.3164E−01 | −4.0526E−02 | −1.0588E−02 | 1.3377E−03 | −6.8097E−04 |
| S9 | −6.4507E−01 | 6.9294E−02 | 2.6871E−03 | 4.1944E−03 | −1.5203E−03 |
| S10 | −8.0675E−01 | 8.5571E−02 | 2.0913E−03 | 1.5171E−03 | 1.4252E−04 |
| S11 | 1.4266E−01 | 2.2474E−02 | 3.1086E−03 | −8.9583E−03 | 4.2726E−03 |
| S12 | 5.3021E−01 | 8.8563E−02 | −6.4220E−03 | −2.1251E−02 | 3.2366E−03 |
| S13 | −8.2731E−01 | 2.5674E−01 | −1.2634E−03 | 7.8101E−04 | 4.1054E−03 |
| S14 | −2.0416E+00 | 2.4236E−01 | −1.1335E−01 | 3.7278E−02 | −1.5572E−02 |

| Surface number | A14 | A16 | A18 | A20 |
|---|---|---|---|---|
| S1 | −3.3666E−04 | −1.5015E−04 | −4.1283E−05 | −1.0264E−05 |
| S2 | −1.5585E−04 | −1.3775E−04 | 8.9155E−05 | −1.8295E−05 |
| S3 | 2.2031E−04 | −1.7730E−04 | 8.3916E−05 | −8.3107E−05 |
| S4 | 3.4010E−04 | 3.1503E−04 | 1.4241E−04 | −1.4019E−05 |
| S5 | 3.3744E−05 | 3.8139E−05 | 4.0629E−05 | −5.6420E−05 |
| S6 | 4.5090E−04 | 2.3278E−05 | 9.7489E−05 | −9.8708E−06 |
| S7 | 7.1714E−04 | 3.6214E−04 | 1.5468E−04 | 3.9271E−05 |
| S8 | 1.0592E−04 | −3.7221E−05 | 6.4380E−05 | 3.1669E−06 |
| S9 | −7.3615E−04 | −1.0663E−05 | 1.3811E−04 | −3.4763E−05 |
| S10 | −7.0002E−04 | 1.4468E−04 | −7.3198E−05 | −4.5752E−05 |

TABLE 14-continued

| | | | | |
|---|---|---|---|---|
| S11 | 2.0349E−04 | −2.3057E−04 | −2.3251E−05 | −2.2630E−05 |
| S12 | 2.5822E−03 | 1.9468E−04 | −3.4982E−04 | −2.1194E−05 |
| S13 | −3.0405E−03 | 3.1903E−04 | 4.9133E−04 | 5.4584E−05 |
| S14 | 2.2614E−03 | −2.0318E−03 | 5.1664E−04 | −3.4222E−04 |

Figure 14A:
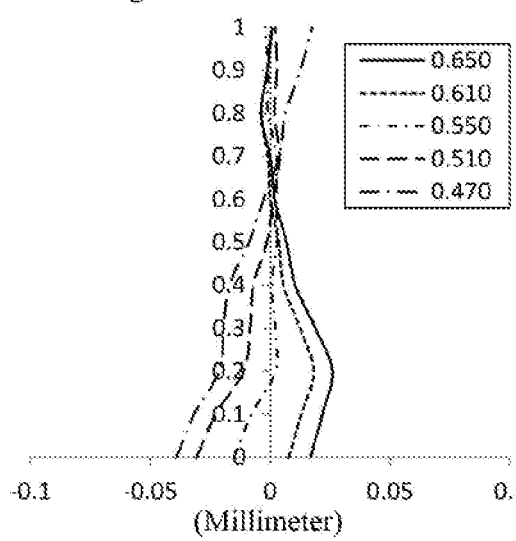
FIGS. 14A to 14C illustrate a longitudinal aberration curve, an astigmatic curve and a distortion curve according to Example 7 of the present disclosure, sequentially.
Figure 14B:
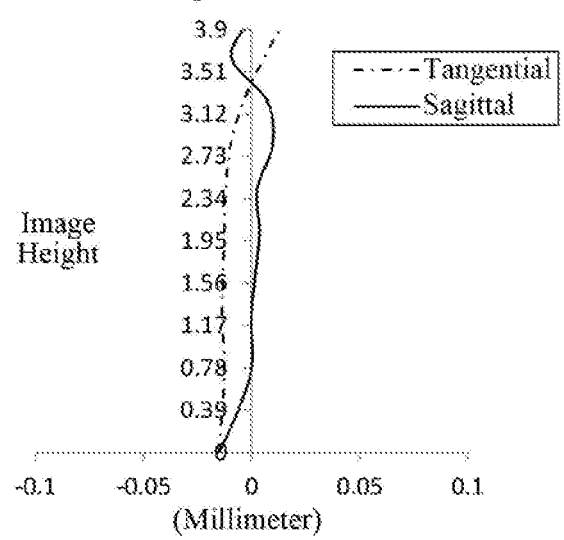
Figure 14C:
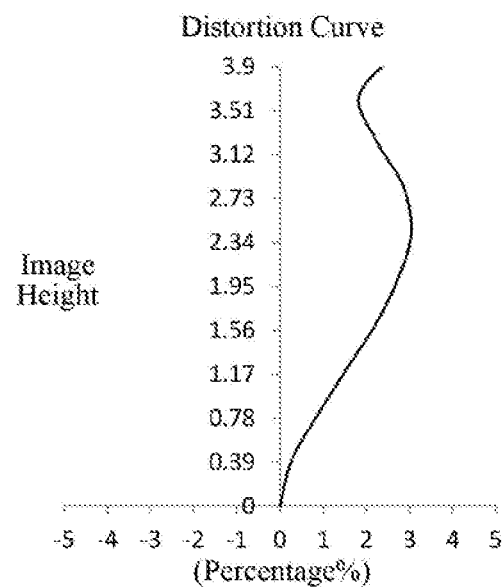

FIG. 14A illustrates a longitudinal aberration curve of the optical imaging lens assembly according to this example, representing deviations of focal points converged by light of different wavelengths after passing through the optical system. FIG. 14B illustrates an astigmatic curve of the optical imaging lens assembly according to this example, representing a curvature of a tangential plane and a curvature of a sagittal plane. FIG. 14C illustrates a distortion curve of the optical imaging lens assembly according to this example, representing amounts of distortion at different image heights. It can be seen from FIG. 14A to FIG. 14C that the optical imaging lens assembly provided in this example may achieve a good image quality.

Example 8

Figure 15:
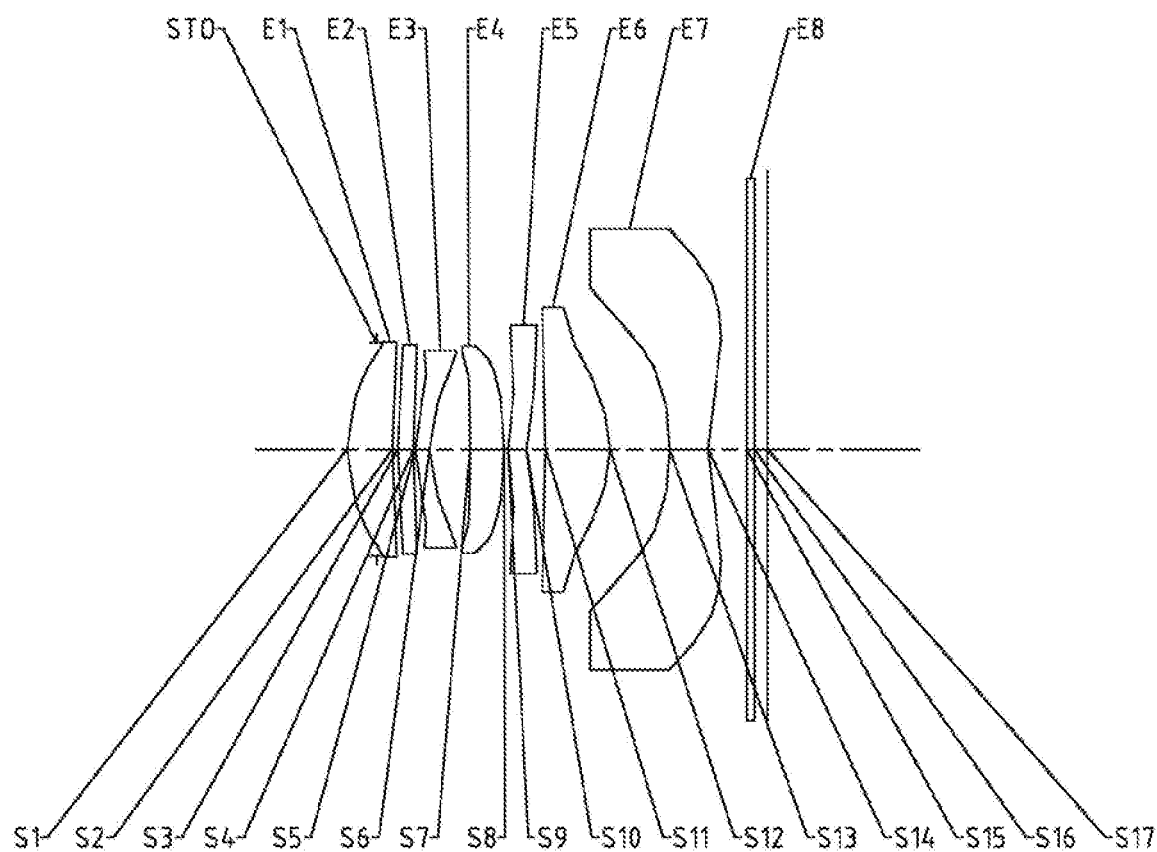
FIG. 15 illustrates a schematic structural view of an optical imaging lens assembly according to Example 8 of the present disclosure.

An optical imaging lens assembly according to example 8 of the present disclosure is described below with reference to FIG. 15 to FIG. 16C. Referring to FIG. 15, an optical imaging lens assembly of this example includes a first lens E1, a second lens E2, a third lens E3, a fourth lens E4, a fifth lens E5, a sixth lens E6, a seventh lens E7, and an optical filter E8, which are sequentially arranged from an object side to an image side along an optical axis. A stop STO may be disposed between the object side and the first lens E1. There may be an air interval between each two adjacent lenses.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a concave surface, and an image-side surface S8 of the fourth lens E4 is a convex surface. The fifth lens E5 has a negative refractive power. An object-side surface S9 of the fifth lens E5 is a convex surface, and an image-side surface S10 of the fifth lens E5 is a concave surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. The optical imaging lens assembly of this example has an imaging surface S17. Light from an object sequentially passes through the respective surfaces (S1 to S16) and is imaged on the imaging plane S17.

Table 15 shows a table of basic parameters of the optical imaging lens assembly in this example as below, wherein the units for the radius of curvature, the thickness and the focal length are millimeter (mm). Table 16 shows high-order coefficients applicable to each aspheric surface of the optical imaging lens assembly in this example, wherein the surface shape of each aspheric surface may be defined by the aforementioned formula (1).

TABLE 15

TTL = 5.97 mm, ImgH = 3.80 mm, Semi-FOV = 40.1°, f = 4.40 mm

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | aspheric | infinite | −0.4198 | | | | |
| S1 | aspheric | 2.4573 | 0.6442 | 1.55 | 56.1 | 6.46 | −0.0668 |
| S2 | aspheric | 7.3430 | 0.0770 | | | | 4.1159 |
| S3 | aspheric | 26.5000 | 0.2219 | 1.67 | 21.8 | 160.61 | −99.0000 |
| S4 | aspheric | 35.0000 | 0.0250 | | | | 99.0000 |
| S5 | aspheric | 1.9720 | 0.2022 | 1.66 | 21.5 | −18.56 | 0.1360 |
| S6 | aspheric | 1.6283 | 0.5738 | | | | −0.0195 |
| S7 | aspheric | −16.3306 | 0.4897 | 1.55 | 56.1 | 13.06 | −62.3105 |
| S8 | aspheric | −5.0165 | 0.0557 | | | | 4.5988 |
| S9 | aspheric | 2.6316 | 0.2598 | 1.67 | 21.8 | −43.58 | 0.1271 |
| S10 | aspheric | 2.3188 | 0.2705 | | | | 0.0316 |
| S11 | aspheric | −12.9046 | 0.9151 | 1.55 | 56.1 | 3.90 | 25.0898 |
| S12 | aspheric | −1.8745 | 0.8474 | | | | −1.4128 |
| S13 | aspheric | −5.3161 | 0.5500 | 1.55 | 56.1 | −3.15 | 2.6783 |
| S14 | aspheric | 2.6399 | 0.5478 | | | | −3.5700 |
| S15 | spherical | infinite | 0.1100 | 1.52 | 64.2 | | |
| S16 | spherical | infinite | 0.1835 | | | | |
| S17 | spherical | infinite | | | | | |

TABLE 16

| Surface number | A4 | A6 | A8 | A10 | A12 |
|---|---|---|---|---|---|
| S1 | −5.1631E−03 | 1.4943E−03 | −8.8473E−04 | −4.6599E−04 | −2.7075E−04 |
| S2 | −1.1447E−01 | 1.8177E−02 | −3.5558E−03 | 7.1944E−04 | 3.4704E−05 |
| S3 | 2.6012E−02 | −8.2174E−03 | 5.7441E−03 | 1.0511E−03 | 8.3901E−04 |
| S4 | 2.9940E−02 | −2.8680E−02 | 1.0713E−02 | −1.6821E−03 | 1.1777E−03 |
| S5 | −4.4312E−01 | 8.0262E−03 | 2.0541E−03 | −2.7638E−03 | 3.7715E−04 |
| S6 | −3.4607E−01 | 1.6723E−02 | −8.3075E−04 | −2.1929E−03 | 1.3900E−04 |
| S7 | −1.2622E−02 | −3.1759E−02 | −1.5117E−03 | 4.0824E−04 | 7.6830E−04 |
| S8 | −8.6019E−02 | −3.9909E−02 | −7.0185E−03 | 1.2458E−04 | −5.1219E−05 |
| S9 | −5.8707E−01 | 5.7616E−02 | 9.0920E−03 | 3.4801E−03 | −1.7144E−04 |
| S10 | −7.2091E−01 | 6.5701E−02 | 2.4995E−02 | 2.3913E−03 | 5.1537E−04 |
| S11 | 1.0622E−01 | −2.6533E−03 | 7.9578E−03 | −4.8379E−03 | 8.0308E−05 |
| S12 | 2.7819E−01 | 4.5261E−02 | 1.9397E−03 | −1.2117E−02 | −2.7556E−03 |
| S13 | −6.6633E−01 | 1.7688E−01 | 1.0424E−02 | 1.3083E−03 | 4.7304E−03 |
| S14 | −1.8853E+00 | 2.2057E−01 | −5.7288E−02 | 3.5650E−02 | −8.5551E−03 |

| Surface number | A14 | A16 | A18 | A20 |
|---|---|---|---|---|
| S1 | −8.6328E−05 | −5.3698E−05 | −2.0992E−05 | −1.2432E−05 |
| S2 | 1.5512E−04 | −1.2756E−04 | 4.2638E−05 | −9.9213E−07 |
| S3 | 3.5854E−04 | −1.1561E−04 | 1.3216E−04 | −2.3581E−05 |
| S4 | −1.0124E−04 | 5.0228E−05 | 1.1115E−04 | 7.5729E−07 |
| S5 | −2.3562E−04 | −7.5357E−05 | 5.5374E−05 | 4.5178E−07 |
| S6 | 1.1745E−04 | −7.5062E−05 | 3.6036E−05 | −4.1768E−07 |
| S7 | 3.3805E−04 | 8.4764E−05 | 3.1133E−05 | −1.0192E−05 |
| S8 | −7.9231E−05 | 4.4334E−05 | −9.9450E−06 | 7.0478E−06 |
| S9 | −8.6815E−04 | −1.2687E−04 | 7.0357E−05 | 2.7687E−05 |
| S10 | −9.2836E−04 | −1.4738E−04 | −3.1865E−05 | 3.1702E−05 |
| S11 | 1.0026E−04 | −7.3815E−05 | 6.9806E−05 | 8.6322E−05 |
| S12 | 3.5252E−04 | 6.2107E−04 | 8.8429E−05 | 5.1196E−05 |
| S13 | −2.8904E−03 | −3.1348E−04 | 4.5191E−04 | 4.0412E−05 |
| S14 | 4.8049E−04 | −1.2206E−03 | 3.8937E−04 | −1.4859E−04 |

Figure 16A:
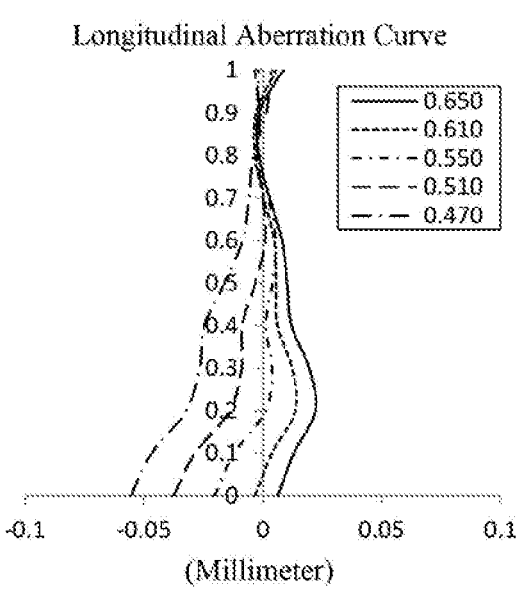
FIGS. 16A to 16C illustrate a longitudinal aberration curve, an astigmatic curve and a distortion curve according to Example 8 of the present disclosure, sequentially.
Figure 16B:
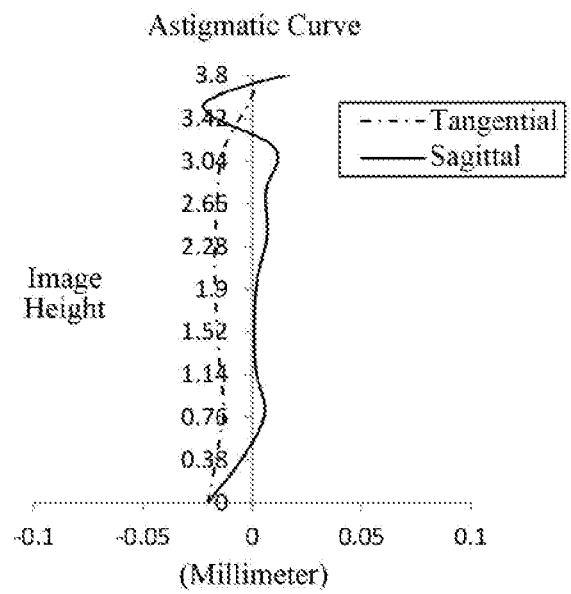
Figure 16C:
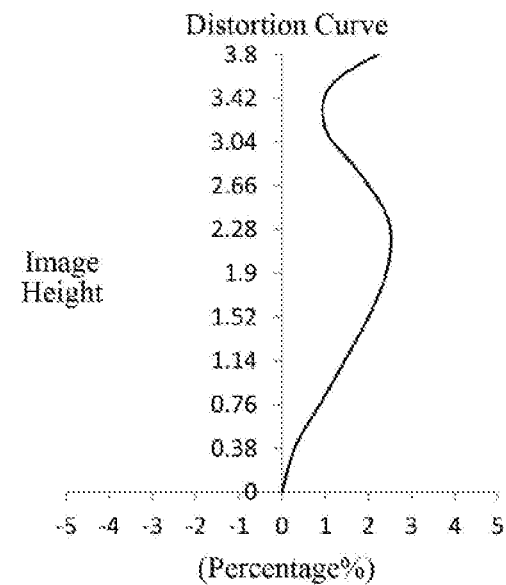

FIG. 16A illustrates a longitudinal aberration curve of the optical imaging lens assembly according to this example, representing deviations of focal points converged by light of different wavelengths after passing through the optical system. FIG. 16B illustrates an astigmatic curve of the optical imaging lens assembly according to this example, representing a curvature of a tangential plane and a curvature of a sagittal plane. FIG. 16C illustrates a distortion curve of the optical imaging lens assembly according to this example, representing amounts of distortion at different image heights. It can be seen from FIG. 16A to FIG. 16C that the optical imaging lens assembly provided in this example may achieve good image quality.

In view of the above, examples 1 to 8 correspondingly satisfy the relationship shown in Table 17 below.

TABLE 17

| Condition | Example | | | | | | | |
|---|---|---|---|---|---|---|---|---|
| | 1 | 2 | 3 | 4 | 5 | 6 | 7 | 8 |
| f/EPD | 1.48 | 1.48 | 1.48 | 1.45 | 1.48 | 1.40 | 1.48 | 1.48 |
| f1/f | 1.51 | 1.36 | 1.33 | 1.38 | 1.52 | 1.46 | 1.45 | 1.47 |
| f23/f4 | −1.77 | −1.36 | −1.04 | −1.13 | −1.15 | −1.76 | −1.96 | −1.62 |
| f6/f7 | −1.26 | −1.29 | −1.42 | −1.38 | −1.25 | −1.27 | −1.29 | −1.24 |
| R2/R1 | 3.13 | 3.91 | 3.97 | 3.20 | 2.62 | 2.78 | 2.91 | 2.99 |
| R5/R6 | 1.21 | 1.28 | 1.29 | 1.25 | 1.18 | 1.18 | 1.47 | 1.21 |
| R7/R8 | 4.35 | 4.24 | 3.10 | 2.70 | 2.15 | 3.23 | 4.94 | 3.26 |
| R9/R10 | 1.15 | 1.16 | 0.97 | 0.97 | 1.01 | 1.13 | 1.20 | 1.13 |
| R11/R13 | 2.92 | 2.42 | 1.53 | 1.62 | 2.94 | 2.54 | 2.51 | 2.43 |
| CT2/(T12 + T23) | 2.44 | 1.71 | 1.52 | 2.16 | 1.94 | 1.90 | 2.72 | 2.18 |
| T34/CT3 | 2.86 | 2.84 | 2.70 | 2.81 | 2.96 | 2.87 | 2.98 | 2.84 |
| CT4/(T45 + T56) | 1.62 | 1.50 | 1.15 | 1.17 | 1.52 | 1.74 | 1.45 | 1.50 |
| CT6/CT7 | 1.78 | 1.68 | 1.60 | 1.52 | 1.73 | 1.71 | 1.76 | 1.66 |
| CT6/ET6 | 2.87 | 2.79 | 2.25 | 1.87 | 2.33 | 2.09 | 2.01 | 2.93 |

TABLE 17-continued

| Condition | Example | | | | | | | |
|---|---|---|---|---|---|---|---|---|
| | 1 | 2 | 3 | 4 | 5 | 6 | 7 | 8 |
| SAG71/SAG62 | 1.82 | 1.94 | 1.93 | 1.79 | 1.64 | 1.68 | 2.08 | 1.71 |
| TTL/ImgH | 1.57 | 1.60 | 1.60 | 1.58 | 1.57 | 1.60 | 1.65 | 1.57 |
| R13/R14 | −2.55 | −2.93 | −2.97 | −2.33 | −1.77 | −1.84 | −3.05 | −2.01 |

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

In an exemplary embodiment, the present disclosure further provides a camera device with an electronic photosensitive element for imaging. The electronic photosensitive element may be a photosensitive Charge-Coupled Device (CCD) or a Complementary Metal-Oxide Semiconductor (CMOS). The camera device may be an independent camera device such as a digital camera, or may be a camera module integrated in a mobile electronic device such as a mobile phone. The camera device is equipped with the optical imaging lens assembly described above.

The exemplary examples of the present disclosure have been described above with reference to the accompanying drawings. Those skilled in the art should understand that the above-mentioned examples are merely examples for illustrative purposes, and are not intended to limit the scope of the present disclosure. Any modifications, equivalent replacements, etc. made within the teaching and the scope of claims of this disclosure shall be included in the scope of protection claimed by this disclosure.

What is claimed is:

1. An optical imaging lens assembly, sequentially from an object side to an image side of the optical imaging lens assembly along an optical axis, comprising:
a first lens having a positive refractive power;
a second lens having a positive refractive power;
a third lens having a negative refractive power;
a fourth lens having a refractive power, an object-side surface of the fourth lens being a concave surface, and an image-side surface of the fourth lens being a convex surface;
a fifth lens having a refractive power;
a sixth lens having a positive refractive power, an object-side surface of the sixth lens being a concave surface, and an image-side surface of the sixth lens being a convex surface;
a seventh lens having a refractive power; and
wherein f/EPD<1.5, where f is an effective focal length of the optical imaging lens assembly and EPD is an entrance pupil diameter of the optical imaging lens assembly; and
1.0<f1/f<2.0, where f is the effective focal length of the optical imaging lens assembly and f1 is an effective focal length of the first lens.

2. The optical imaging lens assembly according to claim 1, wherein the optical imaging lens assembly further comprises a stop, and the stop is disposed between the object side and the first lens.

3. The optical imaging lens assembly according to claim 1, wherein −2.0≤f23/f4<−1.0,
where f23 is a combined focal length of the second lens and the third lens and f4 is an effective focal length of the fourth lens.

4. The optical imaging lens assembly according to claim 1, wherein −1.5<f6/f7<−1.0,
where f6 is an effective focal length of the sixth lens and f7 is an effective focal length of the seventh lens.

5. The optical imaging lens assembly according to claim 1, wherein 2.5<R2/R1 <4.0,
where R1 is a radius of curvature of an object-side surface of the first lens and R2 is a radius of curvature of an image-side surface of the first lens.

6. The optical imaging lens assembly according to claim 1, wherein 1.0<R5/R6 <1.5,
where R5 is a radius of curvature of an object-side surface of the third lens and R6 is a radius of curvature of an image-side surface of the third lens.

7. The optical imaging lens assembly according to claim 1, wherein 2.0<R7/R8 <5.0,
where R7 is a radius of curvature of the object-side surface of the fourth lens and R8 is a radius of curvature of the image-side surface of the fourth lens.

8. The optical imaging lens assembly according to claim 1, wherein 0.5<R9/R10 <1.5,
where R9 is a radius of curvature of an object-side surface of the fifth lens and R10 is a radius of curvature of an image-side surface of the fifth lens.

9. The optical imaging lens assembly according to claim 1, wherein 1.5≤R11/R13<3.0,
where R11 is a radius of curvature of the object-side surface of the sixth lens and R13 is a radius of curvature of an object-side surface of the seventh lens.

10. The optical imaging lens assembly according to claim 1, wherein −3.05≤R13/R14≤−1.77,
where R13 is a radius of curvature of an object-side surface of the seventh lens and R14 is a radius of curvature of an image-side surface of the seventh lens.

11. The optical imaging lens assembly according to claim 1, wherein 1.5≤CT2/(T12+T23)<3.0,
where CT2 is a center thickness of the second lens along the optical axis, T12 is a spaced interval between the first lens and the second lens along the optical axis and T23 is a spaced interval between the second lens and the third lens along the optical axis.

12. The optical imaging lens assembly according to claim 1, wherein 2.5<T34/CT3≤3.0,
where T34 is a spaced interval between the third lens and the fourth lens along the optical axis and CT3 is a center thickness of the third lens along the optical axis.

13. The optical imaging lens assembly according to claim 1, wherein 1.0<CT4/(T45+T56)<2.0,
where CT4 is a center thickness of the fourth lens along the optical axis, T45 is a spaced interval between the fourth lens and the fifth lens along the optical axis, and T56 is a spaced interval between the fifth lens and the sixth lens along the optical axis.

14. The optical imaging lens assembly according to claim 1, wherein 1.5≤CT6/CT7<2.0,
where CT6 is a center thickness of the sixth lens along the optical axis and CT7 is a center thickness of the seventh lens along the optical axis.

15. The optical imaging lens assembly according to claim 1, wherein 1.5<CT6/ET6<3.0,
where CT6 is a center thickness of the sixth lens along the optical axis and ET6 is an edge thickness of the sixth lens.

16. The optical imaging lens assembly according to claim 1, wherein 1.5<SAG71/SAG62<2.5,
where SAG62 is an on-axis distance between an intersection of the image-side surface of the sixth lens and the optical axis and an apex of an effective radius of the image-side surface of the sixth lens, and SAG71 is an on-axis distance between an intersection of an object-side surface of the seventh lens and the optical axis and an apex of an effective radius of the object-side surface of the seventh lens.

17. The optical imaging lens assembly according to claim 1, wherein 1.5<TTL/ImgH<2.0,
where TTL is an on-axis distance from an object-side surface of the first lens to an imaging plane of the optical imaging lens assembly and ImgH is half of a diagonal length of an effective pixel area on the imaging plane.

18. The optical imaging lens assembly according to claim 1, wherein 1.65≤n2, 1.65≤n3 and 1.65≤n5,
where n2 is a refractive index of the second lens, n3 is a refractive index of the third lens and n5 is a refractive index of the fifth lens.

* * * * *